United States Patent
Hirshberg

(10) Patent No.: US 10,360,020 B2
(45) Date of Patent: Jul. 23, 2019

(54) VIRTUAL MACHINE (VM) APPROACH TO EMBEDDED SYSTEM HOT UPDATE

(71) Applicant: NIO USA, Inc., San Jose, CA (US)

(72) Inventor: Yanir Hirshberg, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/484,469

(22) Filed: Apr. 11, 2017

(65) Prior Publication Data

US 2018/0293067 A1    Oct. 11, 2018

(51) Int. Cl.
*G06F 8/656* (2018.01)
*G06F 9/455* (2018.01)

(52) U.S. Cl.
CPC .......... *G06F 8/656* (2018.02); *G06F 9/45558* (2013.01); *G06F 2009/45579* (2013.01)

(58) Field of Classification Search
CPC .................. G06F 8/656; G06F 9/45558; G06F 2009/45579
USPC .......................................................... 717/170
See application file for complete search history.

(56) References Cited

U.S. PATENT DOCUMENTS

| | | | | |
|---|---|---|---|---|
| 8,276,208 B2* | 9/2012 | Morgan | ............. | G06F 11/2023 714/4.11 |
| 8,631,404 B2* | 1/2014 | Laor | ........................ | G06F 8/65 718/1 |
| 8,943,489 B1* | 1/2015 | Qu | .......................... | G06F 8/656 717/168 |
| 9,021,459 B1* | 4/2015 | Qu | ........................... | G06F 8/65 710/33 |
| 9,804,901 B2* | 10/2017 | Gambardella | .......... | H04L 65/80 |
| 2003/0095648 A1 | 5/2003 | Kaib et al. | | |
| 2008/0027602 A1 | 1/2008 | Yeap et al. | | |
| 2008/0163189 A1 | 7/2008 | Chen et al. | | |
| 2008/0168244 A1 | 7/2008 | Chen et al. | | |

(Continued)

FOREIGN PATENT DOCUMENTS

WO    WO2015109804 A1 *    1/2014    ............. H04L 69/40

OTHER PUBLICATIONS

Cisco 1, "Cisco IOS High Availability (HA)—Technical Overview", 2006, http://www.cisco.com/c/dam/en/us/products/collateral/ios-nx-os-software/high-vailability/prod_presentation0900aecd80456cb8.pdf.*

(Continued)

*Primary Examiner* — Hossain M Morshed
(74) *Attorney, Agent, or Firm* — Sheridan Ross P.C.

(57) ABSTRACT

Systems of an electrical vehicle and the operations thereof are provided. Embodiments include an electric vehicle, rechargeable electric vehicle, and/or hybrid-electric vehicle and associated systems. The electric vehicle includes a computing system with a processor executing two or more virtual machines that operate, install, execute, spin down, delete, etc. one or more versions of software, e.g., the operating system. A hypervisor can communicate with the virtual machines (VMs) and function as an intermediary between the VMs and one or more hardware interfaces that communicate with one or more hardware functions of the electric vehicle. The hypervisor can transfer inputs to the two or more VMs from the hardware interfaces, even if one or more of the VMs is operating updated software that has not been verified. Outputs from the VMs can be transferred to the hardware interfaces, unless the software is unverified.

10 Claims, 16 Drawing Sheets

(56) References Cited

U.S. PATENT DOCUMENTS

| | | | |
|---|---|---|---|
| 2009/0138870 | A1 | 5/2009 | Shahindoust et al. |
| 2010/0008510 | A1 | 1/2010 | Zayas |
| 2010/0146231 | A1 | 6/2010 | Gopalan et al. |
| 2013/0013877 | A1* | 1/2013 | Tian ..................... G06F 12/10 711/165 |
| 2014/0004825 | A1 | 1/2014 | Prakash et al. |
| 2014/0137125 | A1* | 5/2014 | Hsu ..................... G06F 9/4856 718/102 |
| 2014/0282470 | A1 | 9/2014 | Buga et al. |
| 2015/0278046 | A1* | 10/2015 | Zellermayer ....... G06F 11/1438 714/4.11 |
| 2015/0301821 | A1 | 10/2015 | Danne et al. |
| 2015/0355898 | A1* | 12/2015 | Zhang ................. G06F 9/4552 717/169 |
| 2016/0210141 | A1* | 7/2016 | Gunti .................. G06F 9/4406 |
| 2016/0210157 | A1* | 7/2016 | Kim .................... G06F 9/4406 |
| 2016/0291959 | A1 | 10/2016 | Searle et al. |
| 2016/0294605 | A1 | 10/2016 | Searle et al. |
| 2016/0335073 | A1 | 11/2016 | Hong |
| 2017/0180391 | A1 | 6/2017 | Hinchliffe et al. |
| 2018/0074842 | A1* | 3/2018 | Fu ............................. G06F 8/65 |
| 2018/0293067 | A1* | 10/2018 | Hirshberg ........... G06F 9/45558 |

OTHER PUBLICATIONS

Cisco 2, "Cisco IOS in service software upgrade", 2007, http://www.cisco.com/c/en/us/td/docs/ios/12_2sb/feature/guide/sb_issu.html.*

Bonomi, "The Smart and Connected Vehicle and the Internet of Things", Cisco, 2013 (Year: 2013).*

Pott, "VMware: We're gonna patent hot-swapping your VMs' host OS," The Register, 2016, retrieved from http://www.theregister.co.uk/2016/08/02/vmware_files_patent_os_hot_swaps/, 7 pages.

Sena, "Secure Over-the-Air-Vehicle Software Updates," International Telecommunication Union, 2015, 49 pages.

U.S. Appl. No. 15/423,186, filed Feb. 2, 2017, Hirshbreg et al.

U.S. Appl. No. 15/849,131, filed Dec. 20, 2017, Wang et al.

International Search Report and Written Opinion for International (PCT) Patent Application No. PCT/US18/26919, dated May 11, 2018, 7 pages.

Notice of Allowance for U.S. Appl. No. 15/423,186, dated Sep. 21, 2018, 8 pages.

International Search Report and Written Opinion for International (PCT) Patent Application No. PCT/US18/66840, dated Feb. 28, 2019, 9 pages.

* cited by examiner

VIRTUAL MACHINE (VM) APPROACH TO EMBEDDED SYSTEM HOT UPDATE

FIELD

The present disclosure is generally directed to updating software in a computing system.

BACKGROUND

In recent years, transportation methods have changed substantially. This change is due in part to a concern over the limited availability of natural resources, a proliferation in personal technology, and a societal shift to adopt more environmentally and user friendly transportation solutions. These considerations have encouraged the development of several new flexible-fuel vehicles, hybrid-electric vehicles, and electric vehicles and the development of autonomous vehicles.

Electric and/or autonomous vehicles require more computing than previous generations of vehicles. With the increased computing demand comes a greater and persistent need to update the software operating on the processor(s) of the electric and/or autonomous vehicle. Unfortunately, upgrading or updating software on an electric and/or autonomous vehicle is more problematic as bugs or errors with the software can create serious and even life-threatening situations for the driver and passengers of the vehicle. As of now, there is no system and/or process for ensuring the safe updating of vehicle software for vehicles that are currently operating.

DETAILED DESCRIPTION

Figure 1:
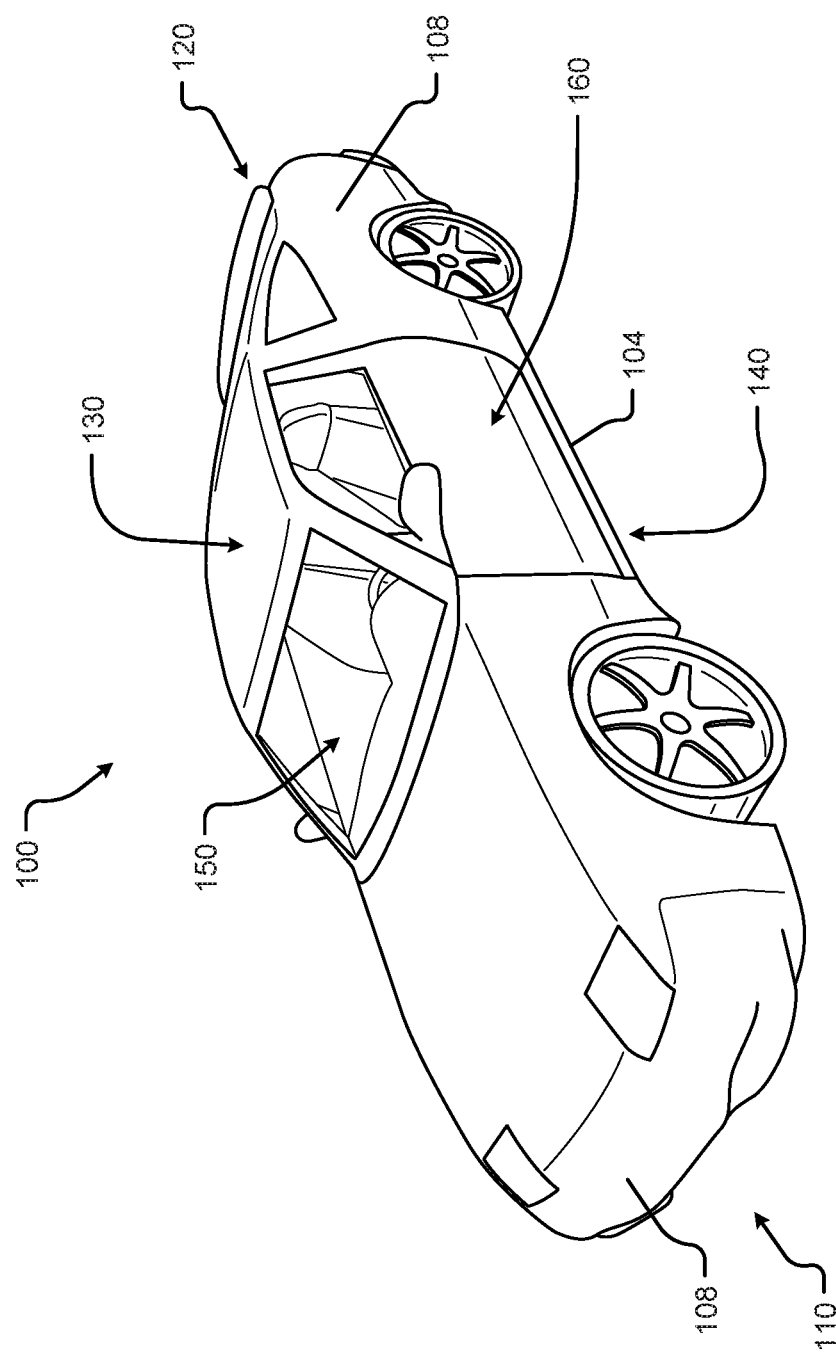
FIG. 1 shows a vehicle in accordance with embodiments of the present disclosure.

Embodiments of the present disclosure will be described in connection with a vehicle, and in some embodiments, an electric vehicle, rechargeable electric vehicle, and/or hybrid-electric vehicle and associated systems. The vehicle includes two or more virtual machines that operate, install, execute, spin down, delete, etc. one or more versions of software, e.g., the operating system. A hypervisor can communicate with the virtual machines (VMs) and function as an intermediary between the VMs and one or more hardware interfaces that communicate with one or more hardware functions of the electric vehicle. The hypervisor can transfer inputs to the two or more VMs from the hardware interfaces, even if one or more of the VMs is operating updated software that has not been verified. Outputs from the VMs can be transferred to the hardware interfaces, unless the software is unverified.

Virtual machines can be implemented with one or more physical servers (e.g., one or more computing systems with a single physical processor or two or more separate physical processors) sharing some type of memory or storage. In configurations described herein, the two or more VMs may be executing on the same physical server or embedded device, and the physical server may include a single processor or control unit that executes the two or more VMs. In at least some configurations, the two or more VMS may each execute in different logical partitions. An operating system (OS) state can be maintained in the shared memory or storage. If the primary server fails, the secondary server may assume the execution of OS using the stored OS state with varying degrees of latency to restore service. With interaction outside the environment being internet protocol (IP) based, rerouting traffic can be done quickly to reduce downtime to milliseconds.

Further, the OS can be upgraded by spinning up a second VM on either the primary or secondary server and cut over to the new OS. This method of updating can apply to a single microcontroller or processor running an OS handling multiple inputs/outputs (I/O). A first version of the OS (referred to as OS 1.0) can be executing with a backup of the OS executing in a second VM. Further, the system may reserve enough processing capability and memory for running a third VM. A second version of the OS (referred to as OS 2.0) may then be employed in the third VM. Inputs are routed to both the active OS (OS 1.0) and the updated OS (OS 2.0). Outputs from OS 1.0 are passed to the hardware, while OS 2.0 outputs are verified by a hypervisor but are not passed to the hardware. Over some period of time, OS 2.0 outputs are verified and are routed to the hardware after OS 2.0 assumes control after cutover.

OS 2.0 can be verified to be functional and becomes the active OS. OS 1.0 is spun down. The OS 1.0 backup may remain executing in second VM for some period of time to function as a hot rollback. After some period of time, an OS 2.0 backup is spawned in the second VM and replaces the OS 1.0 Backup. After the transition to the OS 2.0, processing capability and memory are again reserved for a new, subsequent update.

Thus, the embodiments herein describe a novel technology that allows a hot spare VM to take over operation for a primary VM and another VM (created from hardware resources reserved for updates) to load and test an updated version of the OS. When launching a third VM that has updated software running, both VMs have access to the same hardware simultaneously. However, only the primary VM (executing OS 1.0) can affect the outputs. The second VM (OS 2.0) attempts to provide outputs but the outputs from OS 2.0 are not actually driving the hardware (however, the OS 2.0 is unaware that the outputs are blocked). The blocked outputs may then be checked for accuracy against the outputs from OS 1.0. This configuration is important because the system can verify that the outputs reflect the expected changes and are operating correctly before cutting over to the new OS 2.0. Only after verification can OS 1.0 be torn down.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
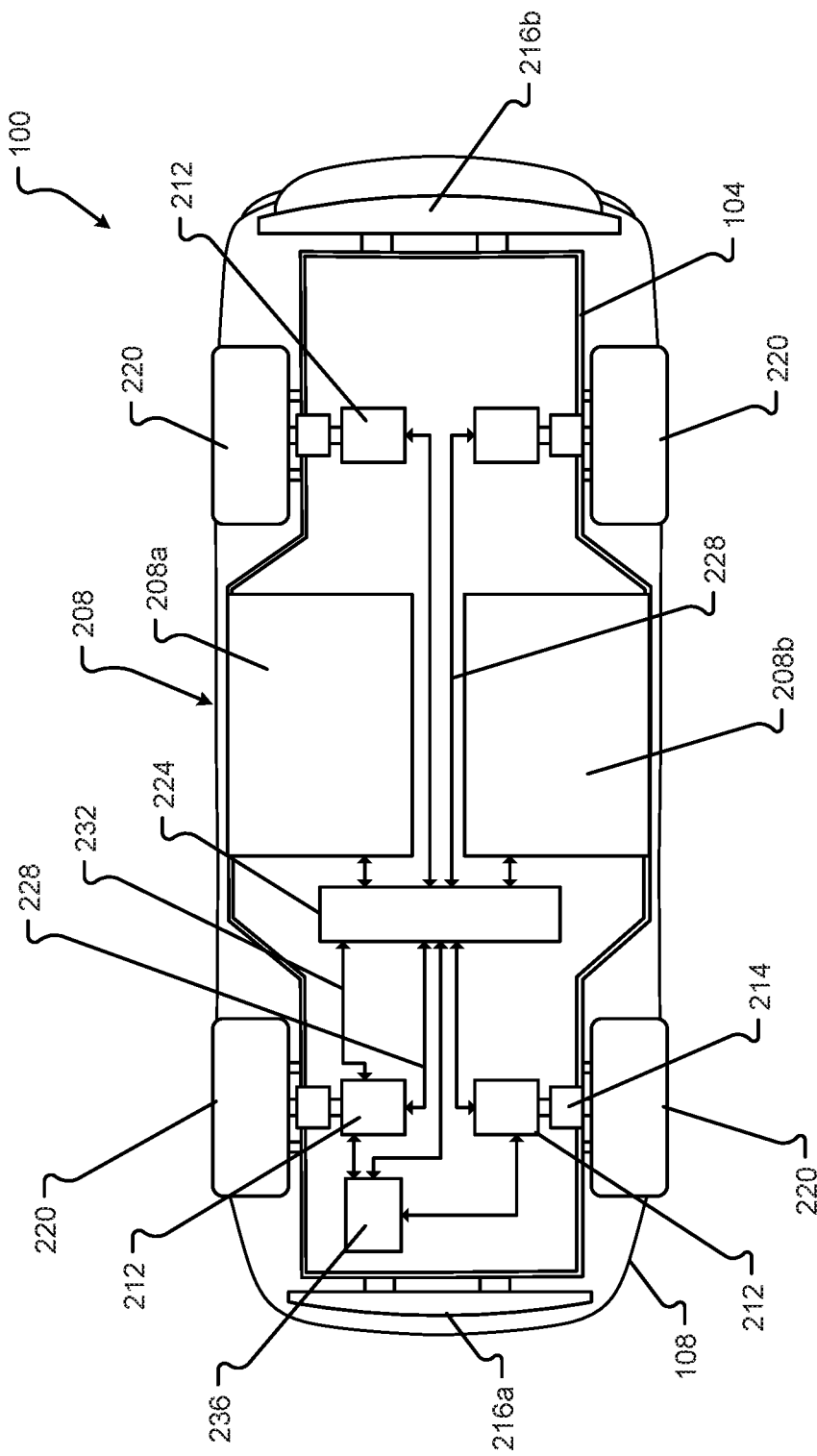
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208a, 208b, motors 212, engines, safety equipment, controllers, user interfaces, interiors exterior components, body panels 108, bumpers 216a, 216b, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208a, 208b (e.g., battery unit, capacitor unit, etc.) from the vehicle 100 and replace the used power source 208a, 208b with a charged or new power source. Continuing this example, the power source 208a, 208b may include selectively interchangeable features that interconnect with the frame 104 or other portion of the vehicle 100. For instance, in a power source 208a, 208b replacement, the quick release features may be configured to release the power source 208a, 208b from an engaged position and slide or move in a direction away from the frame 104 of a vehicle 100. Once removed, or separated from, the vehicle, the power source 208a, 208b may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208*a*, 208*b*. These one or more power sources 208*a*, 208*b* may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208*a*, 208*b* may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208*a*, 208*b* in this manner may provide a number of benefits over conventional vehicle systems. For example, separating the power sources 208*a*, 208*b* allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208*a*, 208*b* is depleted, removed, or becomes otherwise inoperable.

In some embodiments, the drive power source may be separated into two or more cells, units, sources, and/or systems. By way of example, a vehicle 100 may include a first drive power source 208*a* and a second drive power source 208*b*. The first drive power source 208*a* may be operated independently from or in conjunction with the second drive power source 208*b* and vice versa. Continuing this example, the first drive power source 208*a* may be removed from a vehicle while a second drive power source 208*b* can be maintained in the vehicle 100 to provide drive power. This approach allows the vehicle 100 to significantly reduce weight (e.g., of the first drive power source 208*a*, etc.) and improve power consumption, even if only for a temporary period of time. In some cases, a vehicle 100 running low on power may automatically determine that pulling over to a rest area, emergency lane, and removing, or "dropping off," at least one power source 208*a*, 208*b* may reduce enough weight of the vehicle 100 to allow the vehicle 100 to navigate to the closest power source replacement and/or charging area. In some embodiments, the removed, or "dropped off," power source 208*a* may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a power management controller/power electronics unit 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the power management controller/power electronics unit 224 or the power source 208 may include a communication interface. The communication interface can allow the power management controller/power electronics unit 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
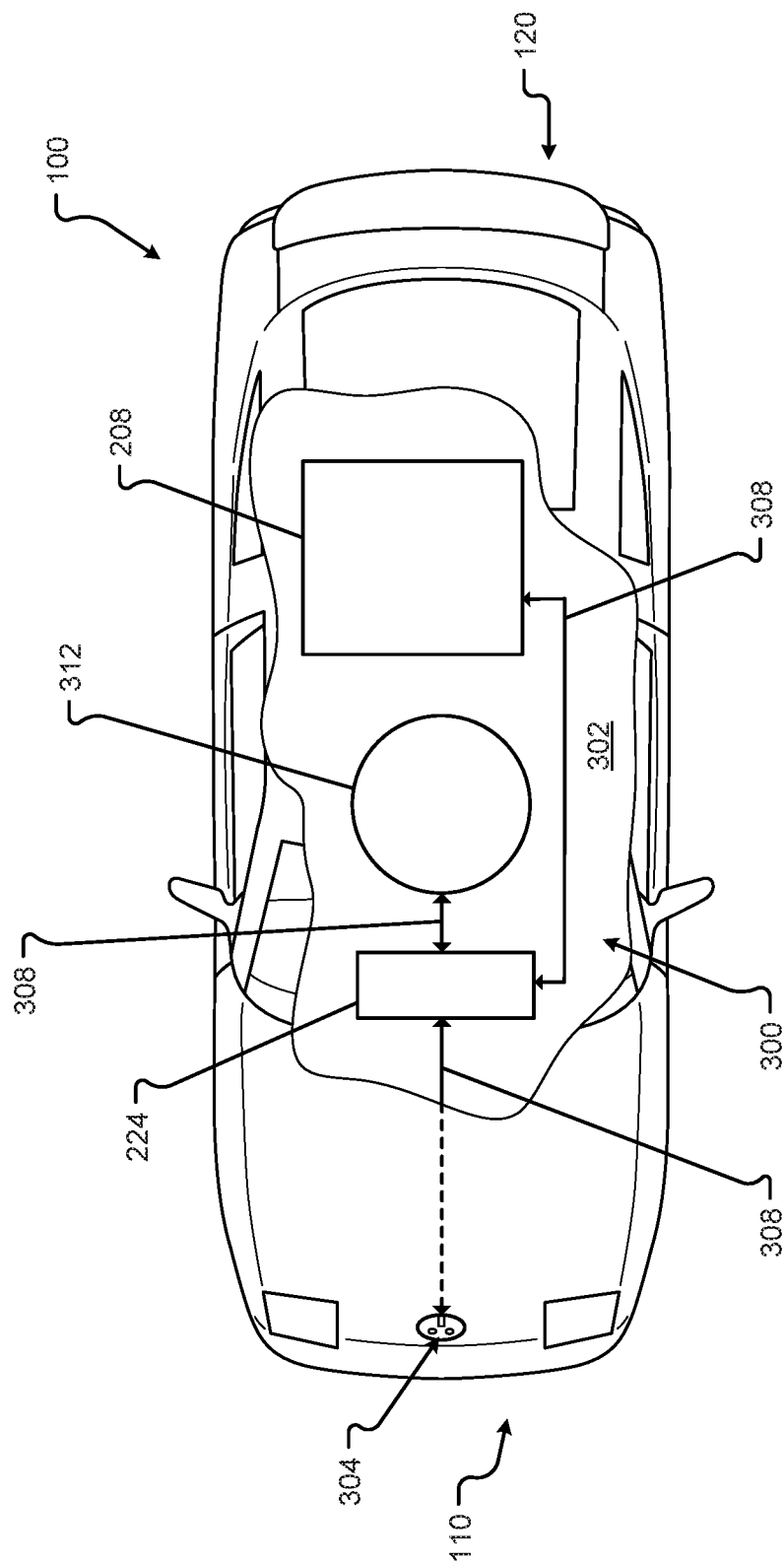
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the power management controller/power electronics unit 224. As provided above, the power management controller/power electronics unit 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
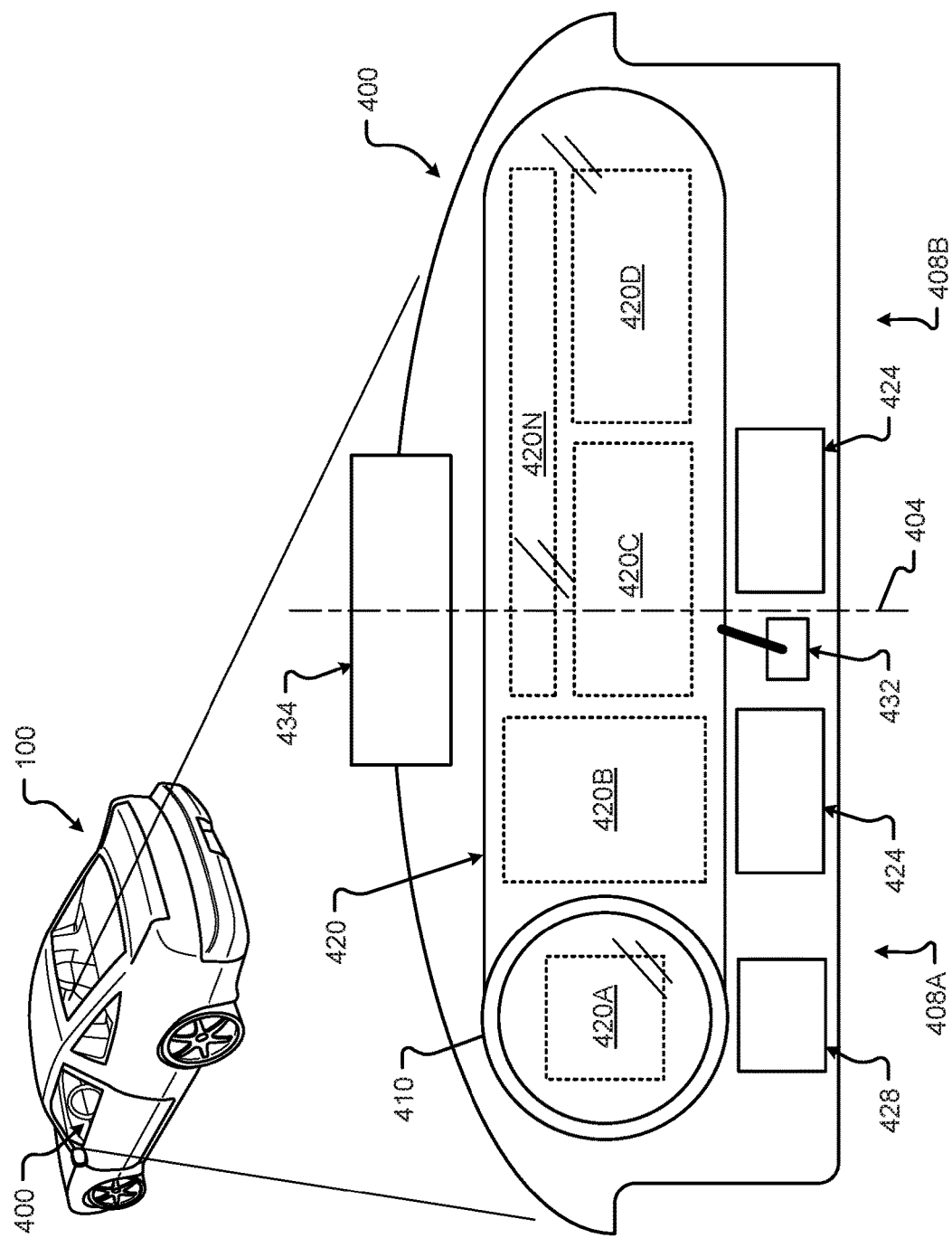
FIG. 4 shows an embodiment of the instrument panel of the vehicle in accordance with embodiments of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
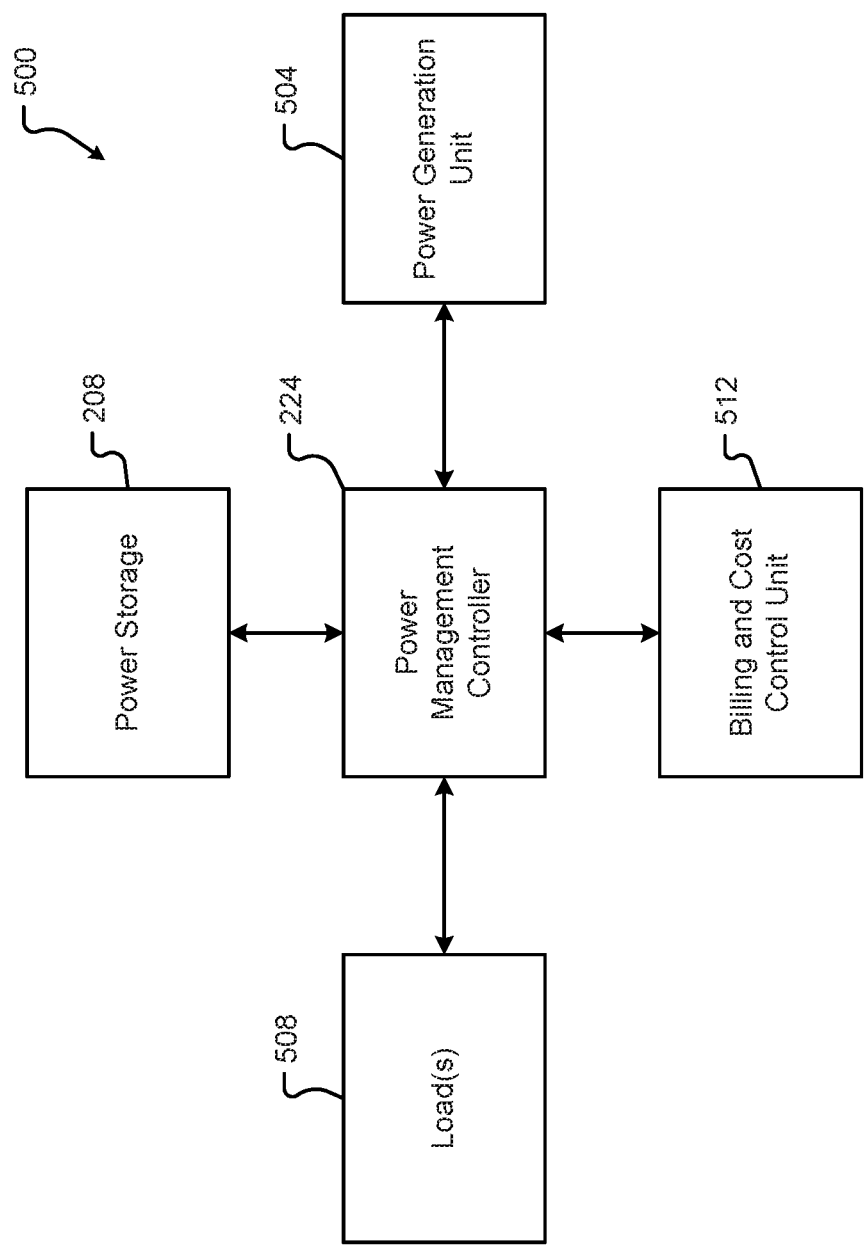
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller/power electronics unit 224. Further, the electrical system 500 can include one or more other interfaces or controllers, which can include the billing and cost control unit 512.

Figure 6:
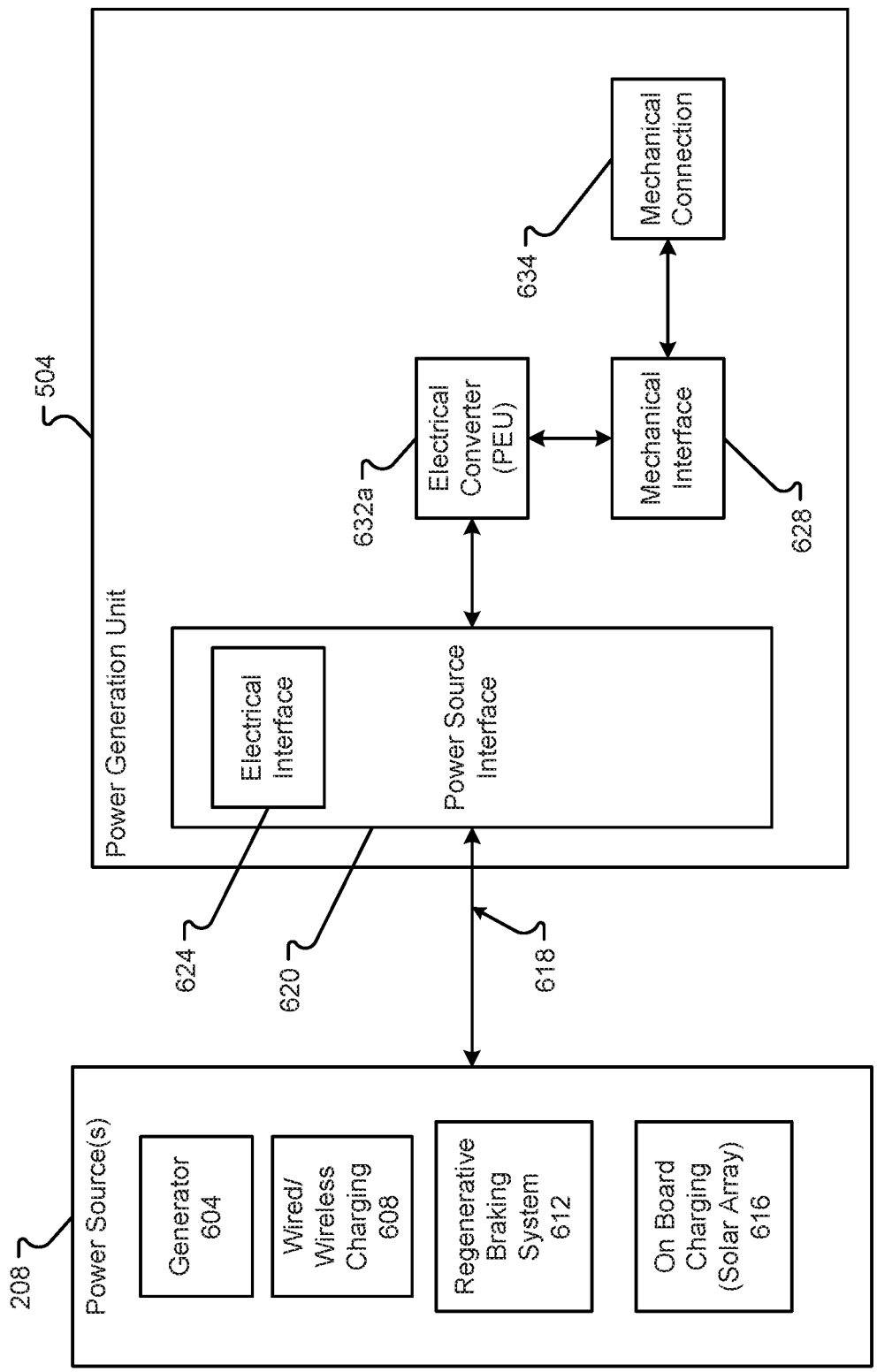
FIG. 6 is a block diagram of an embodiment of a power generation unit associated with the electrical system of the vehicle.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on-board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632, which may comprise all or a portion of the power electronics associated with the power management controller/power electronics unit (PEU) 224. The electric converter 632 may convert the characteristics of the power from one of the power sources into a useable form that may be used either by the power storage 208 or one or more loads 508 within the vehicle 100. The electrical converter 624 may include any electronics or electrical devices and/or component that can change electrical characteristics, e.g., AC frequency, amplitude, phase, etc. associated with the electrical energy provided by the power source 208. The converted electrical energy may then be provided to an optional conditioner (not shown). The conditioner may include any electronics or electrical devices and/or component that may further condition the converted electrical energy by removing harmonics, noise, etc. from the electrical energy to provide a more stable and effective form of power to the vehicle 100.

Figure 7:
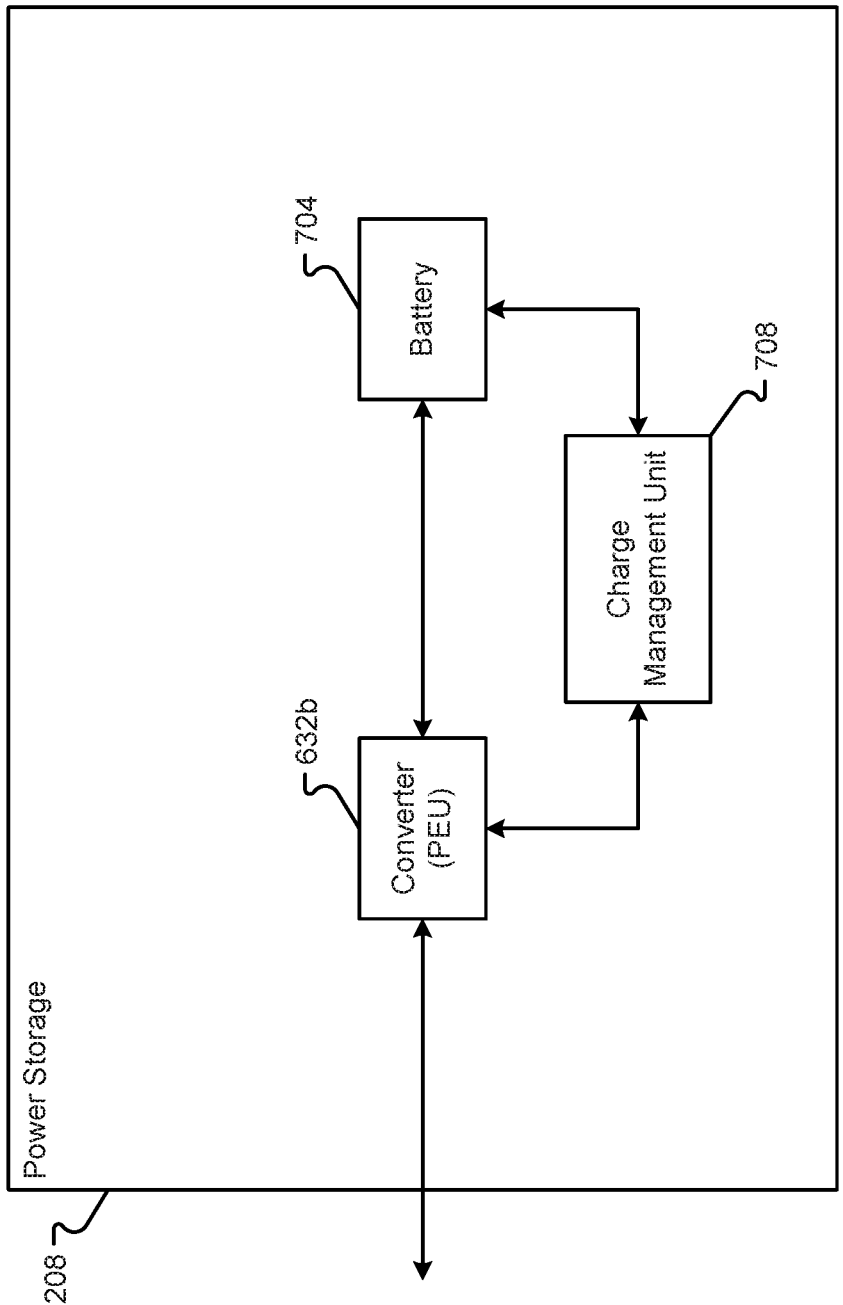
FIG. 7 is a block diagram of an embodiment of power storage associated with the electrical system of the vehicle.

An embodiment of the power storage 208 may be as shown in FIG. 7. The power storage unit can include an electrical converter 632b, one or more batteries, one or more rechargeable batteries, one or more capacitors, one or more accumulators, one or more supercapacitors, one or more ultrabatteries, and/or superconducting magnetics 704, and/or a charge management unit 708. The converter 632b may be the same or similar to the electrical converter 632a shown in FIG. 6. The converter 632b may be a replacement for the electric converter 632a shown in FIG. 6 and thus eliminate the need for the electrical converter 632a as shown in FIG. 6. However, if the electrical converter 632a is provided in the power generation unit 504, the converter 632b, as shown in the power storage unit 208, may be eliminated. The converter 632b can also be redundant or different from the electrical converter 632a shown in FIG. 6 and may provide a different form of energy to the battery and/or capacitors 704. Thus, the converter 632b can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The energy storage 704 may also include one or more high-capacity capacitors 704.

The capacitors 704 may be used for long-term or short-term storage of electrical energy. The input into the battery or capacitor 704 may be different from the output, and thus, the capacitor 704 may be charged quickly but drain slowly. The functioning of the converter 632 and battery capacitor 704 may be monitored or managed by a charge management unit 708.

The charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery/capacitor 704 from this information; the charge management unit 708 may then adjust settings or inputs into the converter 632 or battery/capacitor 704 to control the operation of the power storage system 208.

Figure 8:
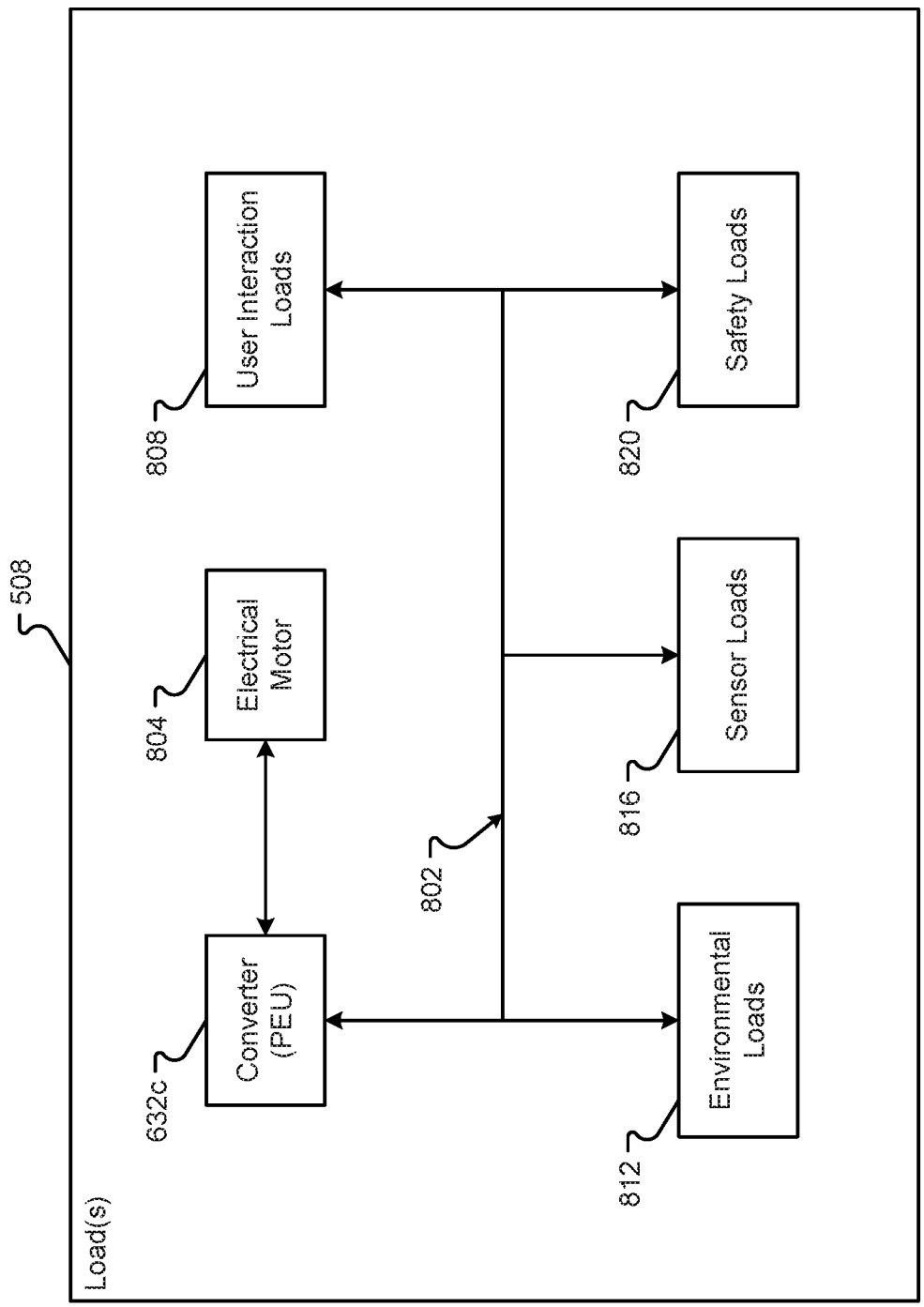
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter (PEU) 632c may be an interface from the power generation unit 504 or the power storage 208 into the loads 508. The converter (PEU) 632c may be the same or similar to electric converter (PEU) 632a as shown in FIG. 6. Similar to the discussion of the converter (PEU) 632b in FIG. 7, the converter (PEU) 632c may be eliminated, if the electric converter (PEU) 632a, shown in FIG. 6, is present. However, the converter (PEU) 632c may further condition or change the energy characteristics for the bus 802 for use by the loads 508. The converter (PEU) 632*c* may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
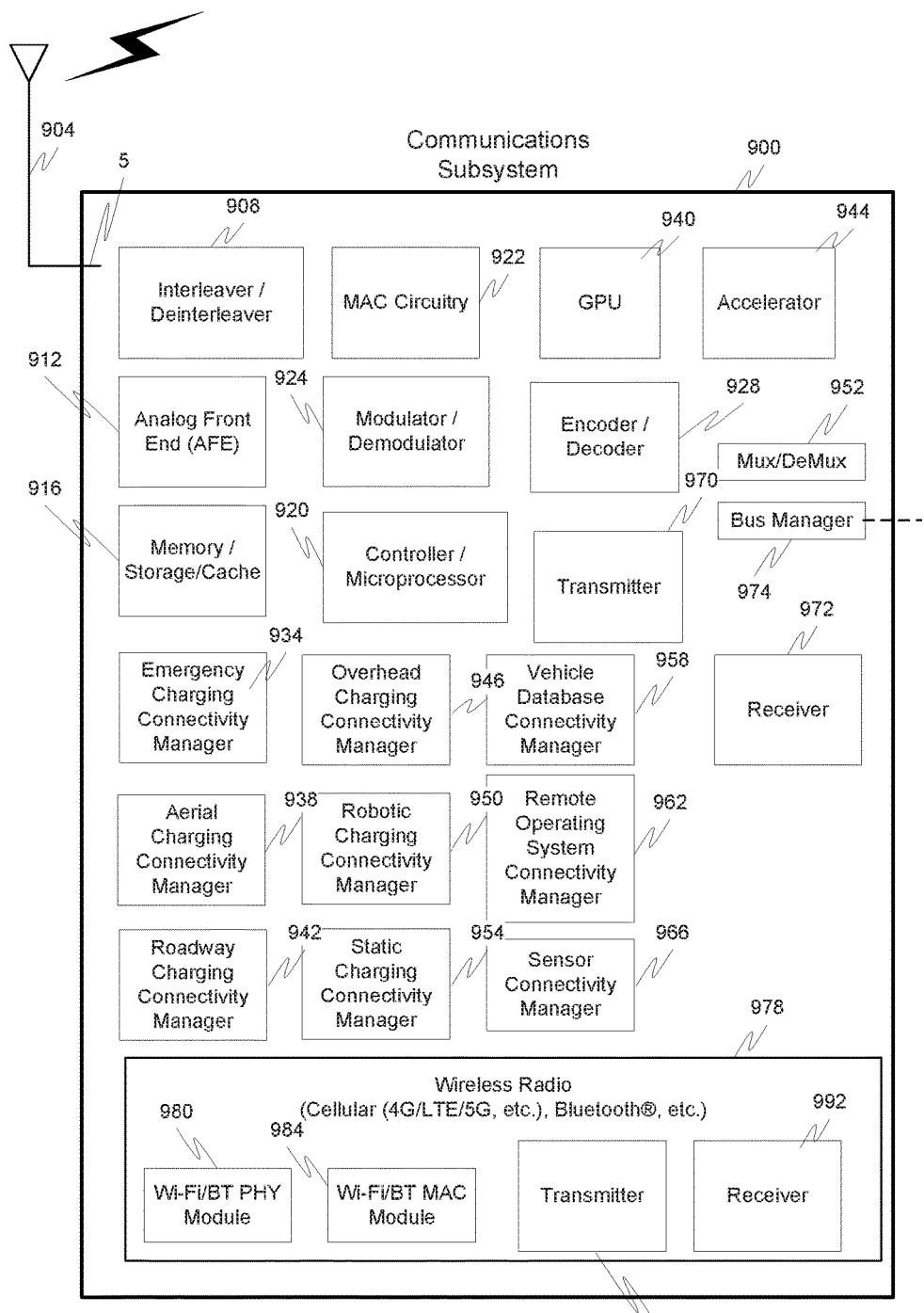
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
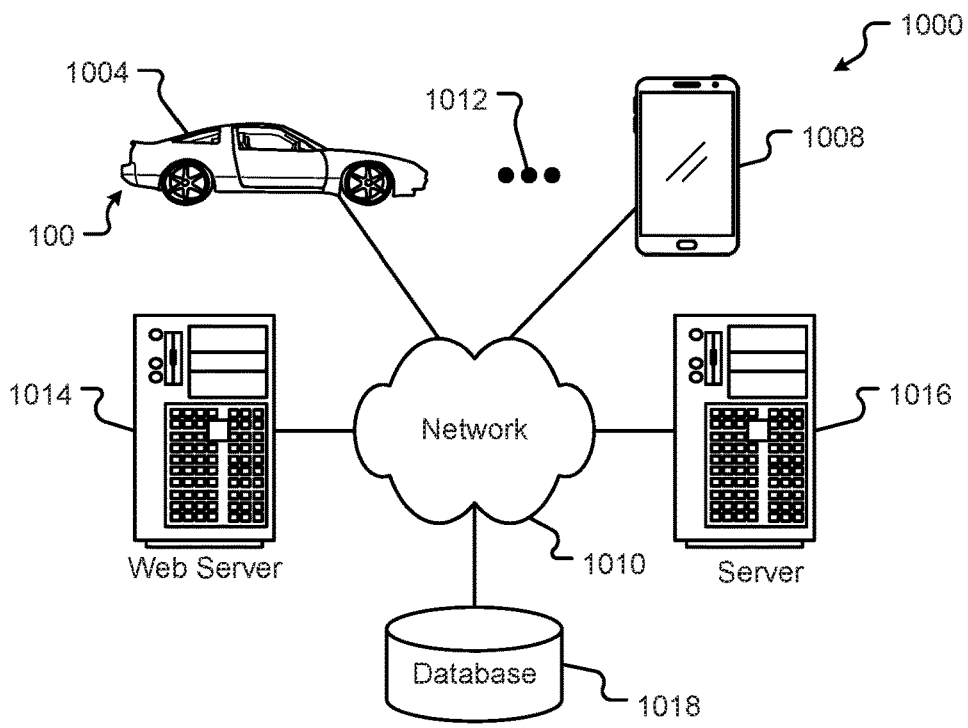
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
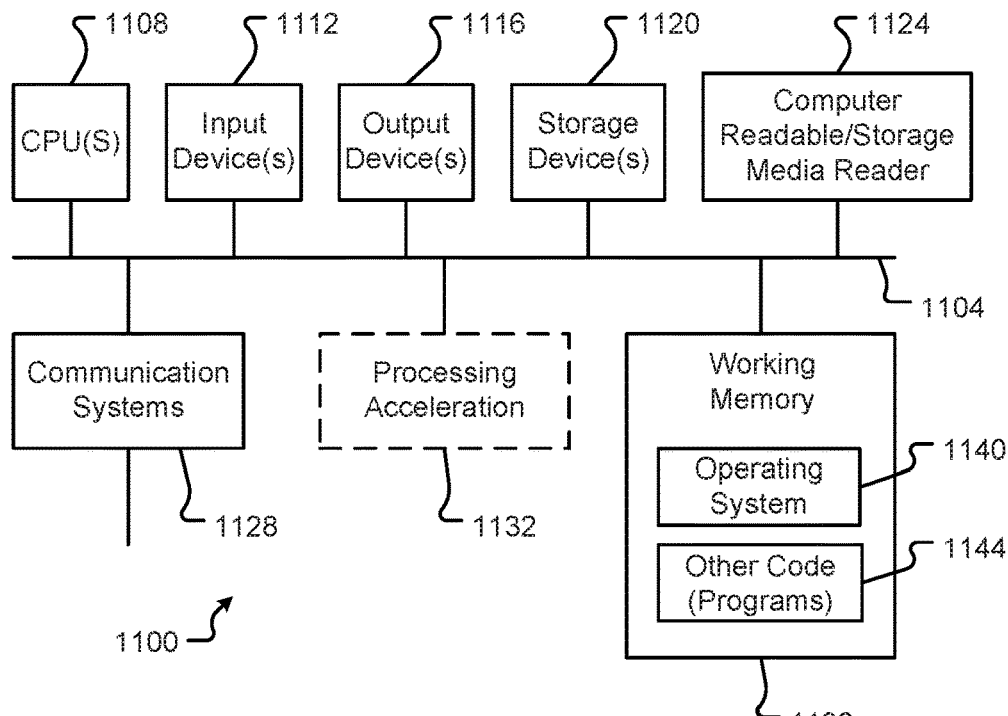
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108, also referred to as a processor(s); one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12A:
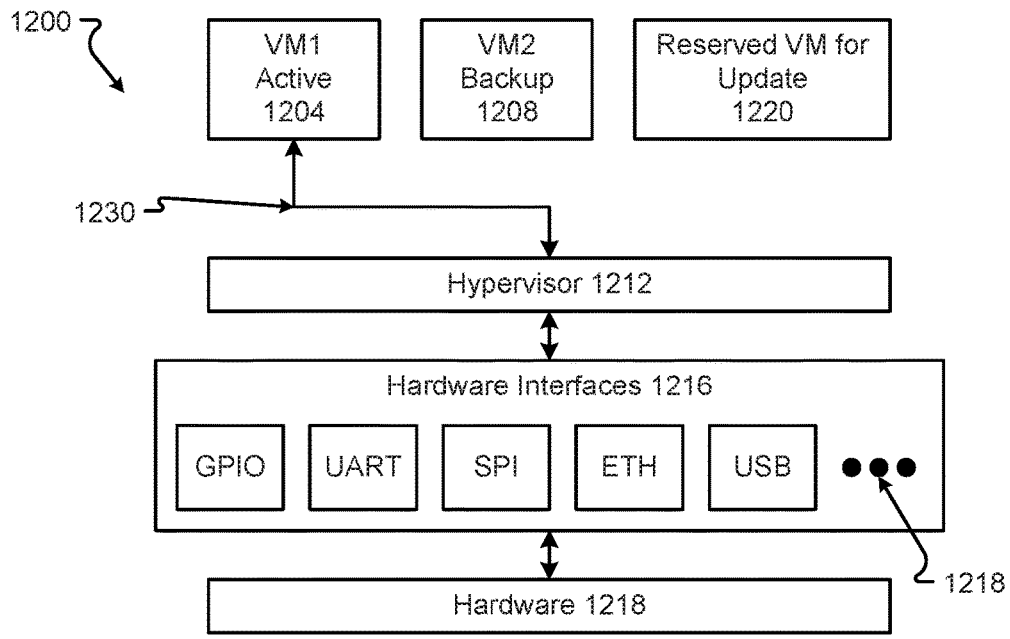
FIG. 12A shows an embodiment of a vehicle computing system allowing for hot update of vehicle software.

An embodiment of a software and/or hardware configuration for an electric vehicle control system 1200 may be as shown in FIGS. 12A through 12D. As represented in FIG. 12A, the OS (or other software) may function or execute within a VM 1204. There may be more than one VM 1204 operating and/or executing an OS or other software, for example, VMs 1204, 1208 may execute an OS. Each VM 1204, 1208, etc. may execute on a separate processor 1108 or within the same processor 1108, in different partitions.

The second VM 1208 may execute a backup copy of the OS that may be used for a hot swap when a failure occurs with the first VM 1204 or with the OS being executed by the first VM 1204. The VMs 1204, 1208, etc. may also be in communication with a hypervisor 1212 through a connection 1230. The hypervisor 1212 functions to communicate information, commands, data, etc. between the VMs 1204, 1208 and the hardware interfaces 1216. The hardware interfaces 1216 may include one or more, but are not limited to, interfaces to Ethernet, USB, UART, etc. to one or more hardware devices/components 1218, as described herein, of the vehicle 100. There may be more hardware interfaces than those shown in FIGS. 12A-12D, as represented by ellipses 1218. The hypervisor 1212 may also be in communication with the backup VM 1208.

In the configuration shown in FIG. 12A, hardware/software resources for a third VM 1220 may be reserved for an update of the OS or other software executed in the VM 1204. This reserved VM space 1220 may include any necessary processing capability/power and/or memory capacity/capability needed to install an update or execute a new version of the OS in a third VM.

Figure 12B:
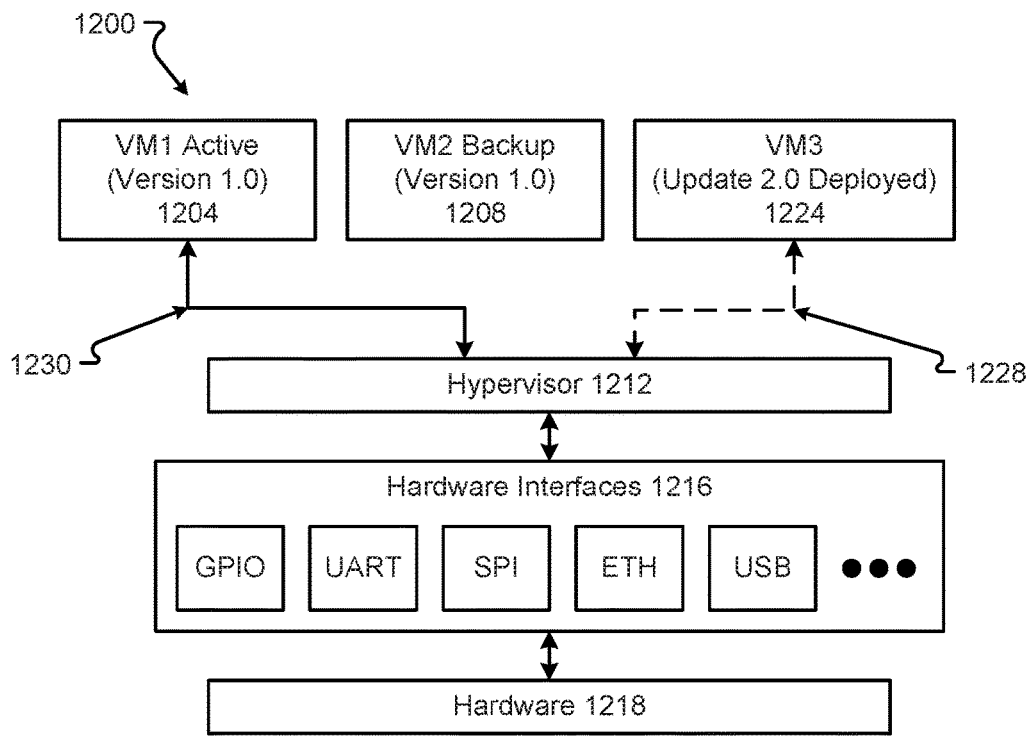
FIG. 12B shows an embodiment of a vehicle computing system allowing for hot update of vehicle software.

FIG. 12B shows that an update or newly-created OS (or software) may be deployed in a third VM 1224 generated in the reserved space 1220. The deployment may include establishing a connection 1228 between the third VM 1224 and the hypervisor 1212. This new connection 1228 may allow the exchange of data, commands, information, etc. between the third VM 1224 and the hypervisor 1212.

However, this connection 1228 may function differently, as explained herein, from the first connection 1230 between the first OS in VM 1204 and the hypervisor 1212.

During some period of testing, both the first OS in VM 1204 and the second OS in VM 1224 may execute or operate concurrently. The hypervisor 1212 can send inputs from the hardware interfaces 1216 to both the first OS in VM 1204 and the second OS in the third VM 1224. Both OSs may process the inputs and provide outputs back to the hypervisor 1212. However, the hypervisor 1212 may drop or block the outputs from the new OS in VM 1224, as received through connection 1228. Outputs from the first OS in VM 1204 are transferred to the hardware interfaces 1216. As such, only the "old" OS in VM 1204 may control the vehicle 100 and the functions associated with the vehicle 100. This configuration may exist for some period of time. Further, the hypervisor 1212 may compare the outputs from the first OS in VM 1204 and the second OS in VM 1224. The comparisons allow the hypervisor 1212 to determine if the new OS in VM 1224 is functioning similarly to the old OS in VM 1204 and thus may not pose a problem if deployed or made active in the vehicle 100.

Figure 12C:
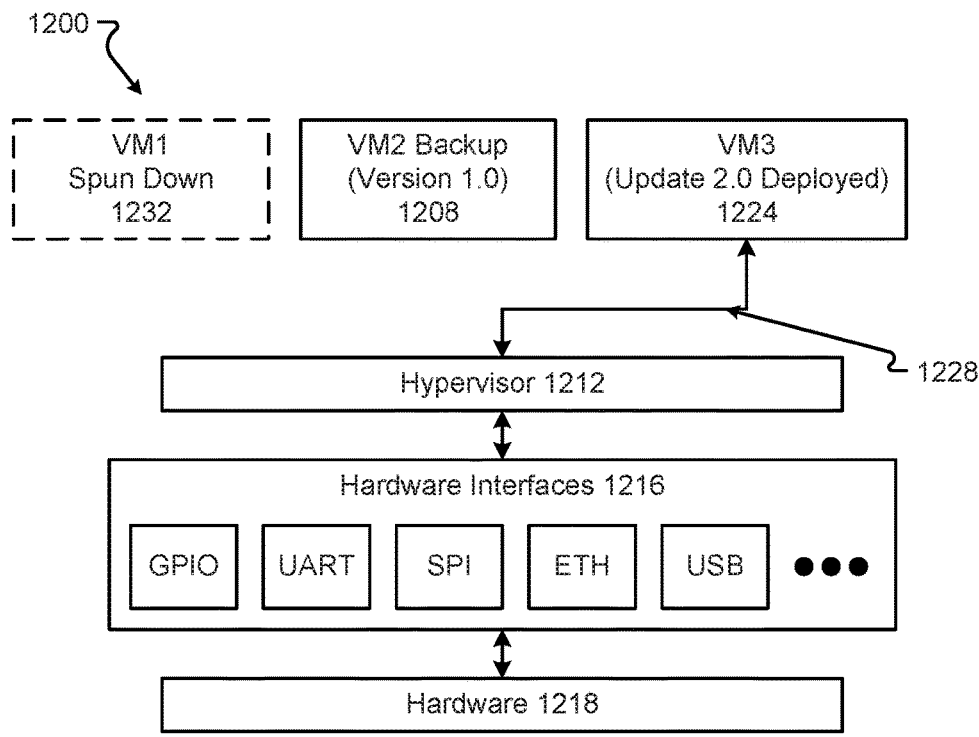
FIG. 12C shows an embodiment of a vehicle computing system allowing for hot update of vehicle software.

After the time period used to verify the new OS in VM 1224, the new OS can become active, as shown in FIG. 12C. The new OS in VM 1224 becomes active where the outputs from the new OS in VM 1224 are sent through connection 1228 through the hypervisor 1212 to the hardware interfaces 1216 to control the vehicle 100 functions. Concurrently, the connection 1230 is deconstructed between the old or legacy OS in VM 1204. The legacy OS in VM 1204 is then spun down or deactivated, eliminating the need for VM 1204. Elimination of the legacy OS and VM 1204 is represented by the dotted box 1232. During this period of transition between the old OS and the new OS in VM 1224, the backup in VM 1208 may still execute the old or legacy OS.

Figure 12D:
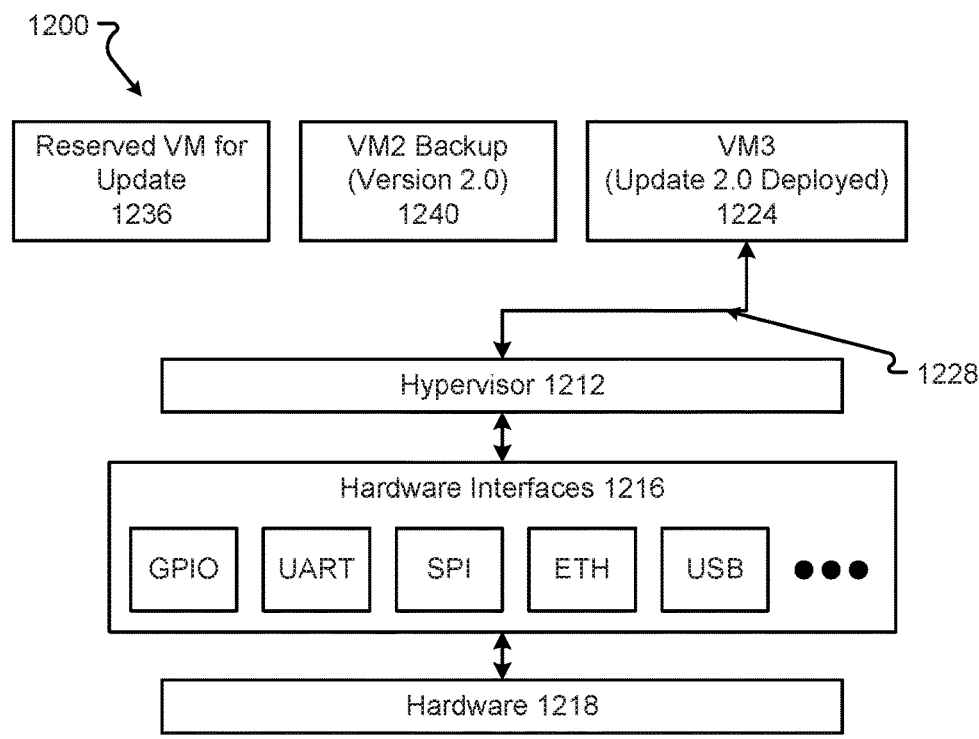
FIG. 12D shows an embodiment of a vehicle computing system allowing for hot update of vehicle software.

To complete the transition to the new OS at some time thereinafter, the backup 1208 may transition to the new OS in VM 1240, as shown in FIG. 12D. Further, when VM 1240 begins executing the new OS, the old OS is completely removed from the vehicle and the processing power and memory once required by the old OS in VM 1204 may then be reserved for a future update, as represented by box 1236, shown in FIG. 12D. In this way, the new OS can be tested for a hot swap to a next version or a newer-updated OS using a different VM in reserved space 1236.

Figure 13:
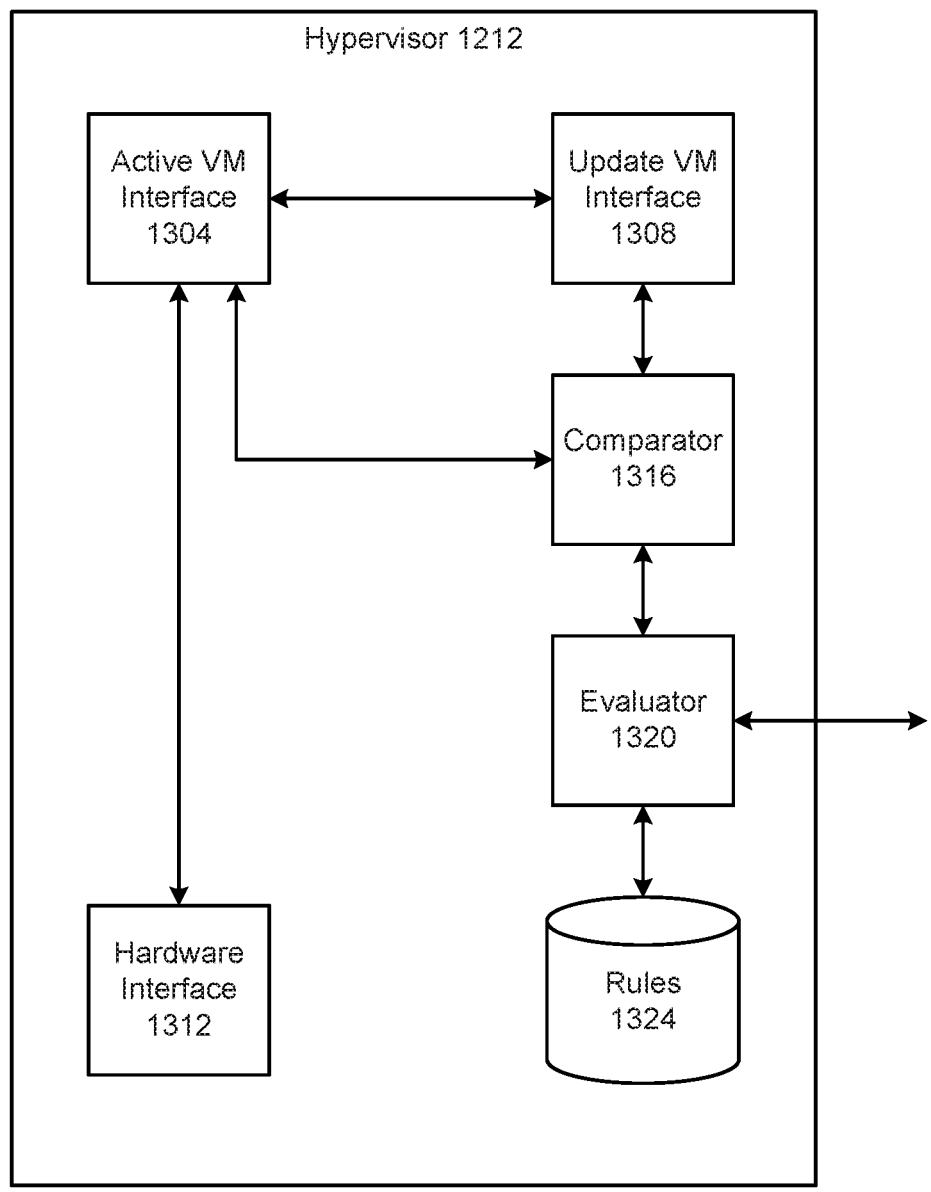
FIG. 13 is a block diagram showing an embodiment of the hypervisor components.

An embodiment of the hypervisor 1212 may be as shown in FIG. 13. The hypervisor 1212 may include one or more components including, but not limited to, an active VM interface 1304, an update VM interface 1308, a comparator 1316, an evaluator 1320, a rules data store 1324, and/or a hardware interface 1312. The active VM interface 1304 can include any of the communications, translation, or other services required for the hypervisor 1212 to communicate with the active VM 1204 (or VM 1224 after transitioning to the second OS). Thus, the active VM interface 1304 is operable to receive and send messages between the active VM 1204/1224 and the hypervisor 1212 over link 1230/1228.

The update VM interface 1308 can perform similar functions to the active VM interface 1304, but for an updated OS provided in a third VM 1224 before transitioning to the second OS. Thus, the update VM interface 1308 can communicate over link 1228 to receive data, send data, send commands, receive commands, etc. that may be communicated between the VM 1224 and the hypervisor 1212. However, any signals received from the VM 1224 over connection 1228, at the update VM interface 1308, will not be communicated through to a hardware interface 1312 that could communicate those communications to hardware interfaces 1216. Further, when the updated OS transitions to becoming active, the link 1228 may be transferred to the active VM interface 1304 from the update VM interface 1308. As such, the active VM interface 1304 and the update VM interface 1308 may communicate to coordinate an exchange of the connection 1228 when the updated OS becomes active, as shown in FIG. 12C.

The hardware interface 1312 may communicate commands through the hypervisor 1212 to the hardware interfaces 1216 (and on to the hardware 1218) and may receive signals from the hardware interfaces 1216 to be provided to the VMs 1204, 1224. The hardware interface 1312, as shown, is only connected with the active VM interface 1304 to ensure that the update VM interface 1308 does not send signals through the hypervisor 1212 to the hardware interfaces 1216 during the evaluation period, as shown in FIG. 12B. In other configurations, the hardware interface 1312 may have a unidirectional connection with the update VM interface 1308 to send signals only from the hardware interfaces 1216 to the update VM interface 1308 without accepting signals back from the update VM interface 1308.

A comparator 1316 can receive the outputs from both the active VM interface 1304 and the update VM interface 1308. These "duplicate" outputs may be in response to the same input and may be compared by the comparator 1316. As such, the comparator 1316 can determine if the active VM 1204 and updated VM 1224 are reacting to inputs similarly. To ensure that the update VM interface 1308 is providing the same or sufficiently similar outputs as the active VM interface 1304. In this way, the comparator 1316 checks that the update VM interface 1308 is functioning as desired or as expected. The information associated with the comparisons of the two output signals may then be provided to an evaluator 1320.

The evaluator 1320 may provide a determination of the effectiveness or suitability of the new OS operating in VM 1224. This evaluation may determine the number of signals received by the comparator 1316 from VM 1224 that are duplicates or compare to the outputs of the active VM interface 1304. There may be some type of rule(s) or requirement(s) provided in rules data store 1324. Based on the rule(s), the evaluator 1320 can determine whether the updated OS, executing in VM 1224, should be transitioned to the active operating system, as shown in FIG. 12C. The rule(s) may be as explained in conjunction with FIG. 14.

The evaluator may then make some signal as to whether the new OS running in VM 1224 can be or should be made active. The signal may be sent to an external source, to a user interface, or some other system or component exterior to the hypervisor 1212 to receive input (e.g., user acquiescence) as to complete the deployment of the new OS in VM 1224. In other situations, the evaluator 1320 may send an automated signal to both the update VM interface 1308 and active VM interface 1304 to transition the new OS in VM 1224 to active, as described in conjunction with FIGS. 12C and 12D. This automated transition may occur according to the rule(s) 1324.

Figure 14:
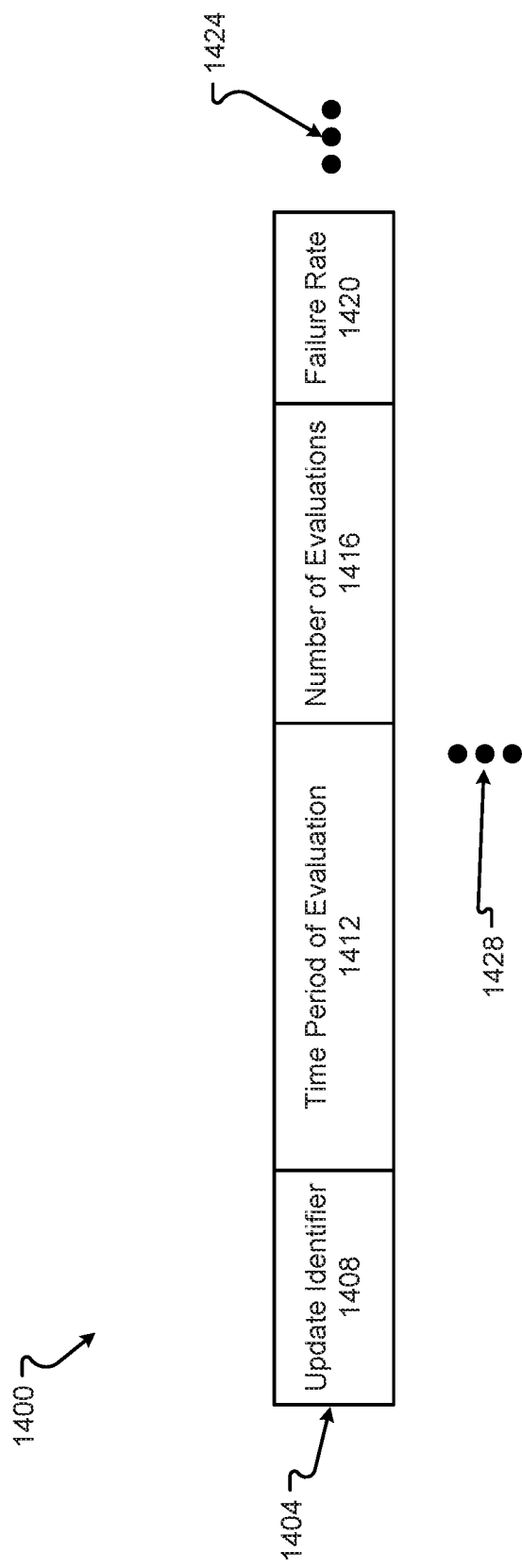
FIG. 14 is a data diagram showing an embodiment of rules used by the hypervisor when updating software.

An embodiment of a data store 1400 that may be the same or similar to the rules data store 1324 may be as shown in FIG. 14. Here, there may be one or more rules 1404 that apply to one or more types of software being updated in the VMs 1204, 1208, 1224. These one or more sets of rules 1400 may apply to a single update or to several different updates, as represented by ellipses 1428. Each update rule 1404 or set of conditions may include one or more of, but is not limited to, an update identifier 1408, a time for evaluation 1412, a number of evaluations 1416, and/or a failure rate 1420.

The update identifier 1408 can be an identifier to determine to which update of the OS (or other software) the update rule 1404 applies. For example, the update identifier 1408 may be a globally unique identifier (GUID) of the OS update executing in VM 1224. In other situations, the update ID 1408 may employ a different identifier or may identify certain components within the OS rather than an entire OS running in the VM 1224. Regardless, the update ID 1408 is unique to this current session or update and cannot be duplicated within the rule data set 1400 to ensure that the current rule 1404 is only applied to the current update.

The time for evaluation 1412 may be a time or some type of limit to how long the updated OS, executing in VM 1224, will execute in conjunction with the legacy OS, executed in VM 1204. This time for evaluation 1412 may be based on an actual time duration in days, seconds, and/or minutes, etc., may be based on the occurrence of some type of event that could occur in the future, or may be based on some other limit or temporal duration of the evaluation.

The number of evaluations limit 1416 can be similar to the time for evaluation limit 1412 but may be directed to the number of times the output of the new OS, executing in VM 1224, may be compared with the output from the legacy OS, running in VM 1204. Thus, the evaluation period described in FIG. 12B may be limited by the number of evaluations needed before determining the efficacy or accuracy of the updated OS. This number of evaluations can be any number of evaluated outputs, e.g., 1,000 different outputs, 1,000,000 different outputs, etc.

The failure rate 1420 can include the information required for the evaluator 1320 to determine if the new OS meets the acceptability benchmark to allow the deployed OS, in VM 1224, to become active, as described in conjunction with FIG. 12C. The failure rate 1420 may be a number of required positive comparisons provided by the comparator 1316, may be the limit on number of errors provided by the comparator 1316, or may be other information for the evaluator 1320 to determine whether the new OS is safe to deploy. Thus, the evaluator 1320 can continue to store and update the failure rate, and compare the measured failure rate to the failure rate benchmark, in data field 1420, until the time for evaluation 1412 or the number of evaluations 1416 is met. At that point, if the failure rate meets the benchmark, the evaluator 1320 can send a signal to request transition to the new OS, as described in conjunction with FIG. 13, or the evaluator can automatically transition the new OS to active status, as described in conjunction with FIGS. 12C and 13.

Figure 15:
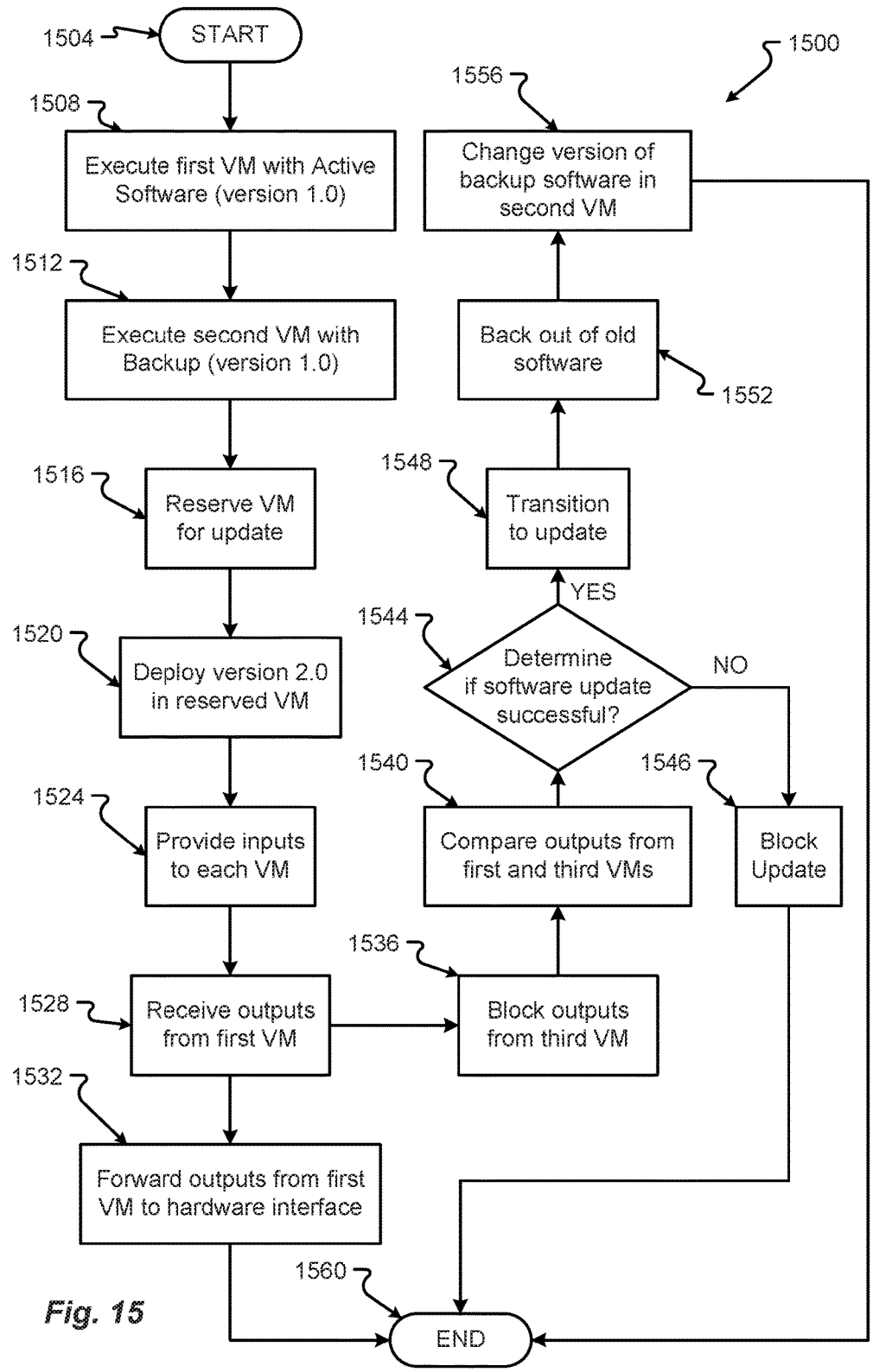
FIG. 15 is a method diagram providing an embodiment of a method for updating software in an electric vehicle.

An embodiment of a method 1500 for evaluating the efficacy of the newly-deployed and/or updated OS running in a different VM 1224 may be as shown in FIG. 15. The method 1500 may be from the perspective of a hypervisor 1212. A general order for the steps of the method 1500 is shown in FIG. 15. Generally, the method 1500 starts with a start operation 1504 and ends with an end operation 1560. The method 1500 can include more or fewer steps or can arrange the order of the steps differently than those shown in FIG. 15. The method 1500 can be executed as a set of computer-executable instructions executed by a computer system or processor and encoded or stored on a computer readable medium. Hereinafter, the method 1500 shall be explained with reference to the systems, components, circuits, modules, software, data structures, signaling processes, etc. described in conjunction with FIGS. 1-14.

A processor 1108 can execute a first VM 1204 having active software, which may be an active OS, in step 1508. Thus, the processor 1108 creates the VM 1204 within the operating environment, establishes a connection 1230 between the VM 1204 and the hypervisor 1212. This active OS may receive all the inputs from hardware interfaces 1216 in the vehicle 100 and provide outputs or commands to the hardware interfaces 1216 to ensure proper operation of the hardware 1218 associated with the vehicle 100.

In step 1512, the processor 1108 may create a second VM 1208 to execute a backup version of the OS. This backup VM 1208 may stand as a hot-swappable backup providing for the storage and/or the communication of the OS state, on a persistent basis, for the backup VM 1208. If a failure occurs with the original OS in VM 1204, the backup version of the OS in VM 1208. Thus, the backup VM 1208 may assume execution of the functions of the OS and communicate with the hypervisor 1212 for the vehicle 100 if the first VM 1204 or active OS fails.

A reserved area 1220 providing reserved processing capability of the processor 1108 and storage capacity within memory 1138 may allow for updates of the OS, in step 1516. Thus, the reserved VM space 1220 may sit dormant but allow for the capability of providing an OS update to be executed by the processor 1108. In step 1520, a second OS (e.g., an updated version of the OS) or a software update may be deployed within this reserve section 1220 to create a third VM 1224. The second or updated OS may then execute simultaneously with the first OS in VM 1204.

During the simultaneous operation of VM 1204 and VM 1224, the update VM interface 1308 of the hypervisor 1212 may make a connection with the third VM 1224 through link 1228. This link 1228 may be similar to the link 1230 between the active VM interface 1304 of the hypervisor 1212 and the first VM 1204. During the duplicated deployment, the hypervisor 1212 can provide inputs to both the first VM 1204, through the active VM interface 1304, and a third VM 1224, through update VM interface 1308, in step 1524. Thus, as the hardware interface 1312 receives signals from the hardware interfaces 1216, the signals may be transferred from the hardware interface 1312 to the active VM interface 1304 to be sent to the VM 1204. Either the active VM interface 1304 or the hardware interface 1312 may also communicate the signals to the update VM interface 1308 to send the same inputs to the third VM 1224 through link 1228.

Sometime thereinafter, the first OS operating in the VM 1204 may send an output from the VM 1204 back to the active VM interface 1304 of the hypervisor 1212. Similarly, the updated OS operating in VM 1224 may also send an output through link 1228 to the update VM interface 1308. The hypervisor 1212 receives outputs from both the first and third VMs 1204, 1208, in step 1528. The outputs received by the active VM interface 1304 may then be forwarded to the hardware interface 1312 to be sent to the hardware interfaces 1216, in step 1532. Unlike the outputs from the first VM 1204, the outputs received, through link 1228 from VM 1224 at the update VM interface 1308, are blocked, in step 1536. In other words, the update VM interface 1308 does not forward the outputs from the third VM 1224 to the hardware interface 1312. Rather, the outputs from the update VM interface 1308 are sent to the comparator 1316, and the active VM interface 1304 also sends the related output from the active VM interface 1304 to the comparator 1316, in step 1540.

The comparator 1316 may then compare the outputs received by the active VM interface 1304 from the first VM 1204 and the output received at the update VM interface 1308 from the third VM 1224 that is operating the updated OS. The results of the comparison, whether the outputs signals are the same or at least within acceptable tolerances, may be then sent to the evaluator 1320.

The evaluator 1320 may then determine if the OS updated and executing in the third VM 1224 is running successfully or is efficacious, in step 1544. The evaluator 1320 may receive one or more comparisons from the comparator 1316 and other information about the execution of the VM 1224. This received information may be compared to the update rules 1304 to determine if the updated OS executing in VM 1224 is executing properly and will cause no harm to the operation of the vehicle 100. If the evaluator 1320 determines that the update is successful and/or efficacious, and the OS should be deployed or executed rather than the legacy OS in VM 1204, the method 1500 proceeds YES to step 1548. In contrast, if the evaluator 1320 determines that the update of the OS running in VM 1224 is not successful, not efficacious, or dangerous, the method 1500 proceeds NO where the evaluator sends a signal 1320 to block the update in step 1546.

Blocking the update in step 1546 may be a signal to the processor 1108 to delete or spin down the update in VM 1224. In other embodiments, the signal may be sent to an external source, such as the supplier of the update, to inform the supplier that the update is unsuccessful and may need to be evaluated for pull back from fleet-wide distribution to other vehicles. The instances of spinning down the VM 1224 and alerting the outside source may also occur in combination.

In step 1548, the processor then transitions the update for execution, as described in conjunction with FIG. 12C. Here, the processor 1108 may make the VM 1224 active for the OS, establishing the connection 1228 and eliminating connection 1230. Thus, the hypervisor 1212 may transition the connection 1228 from the update VM interface 1308 to the active VM interface 1304. The outputs from VM 1224 may then be sent to the hardware interface 1312 and on to the hardware interfaces 1216 through the hypervisor 1212. This transition establishes the updated OS in VM 1224 as the active OS.

Thereinafter, the VM 1204 is spun down, in step 1552, to back out the legacy OS in VM 1204. Thus, the VM 1204 goes through a spin-down state 1232 where the old or legacy OS is extracted and deleted from the memory 1136. In other situations, the OS may be left in place but just cease to function. During a spin-down procedure, as described in FIG. 12C, the backup OS running in VM 1208 may continue to be the legacy OS. However, sometime thereinafter, the backup OS in VM 1208 is transitioned to the updated version of the OS associated with the OS executing in VM 1240, in step 1556. Then, the legacy OS is completely removed, and the processing capability 1108 and memory 1136 is made available for a future update as capability reservation 1236.

Figure 16:
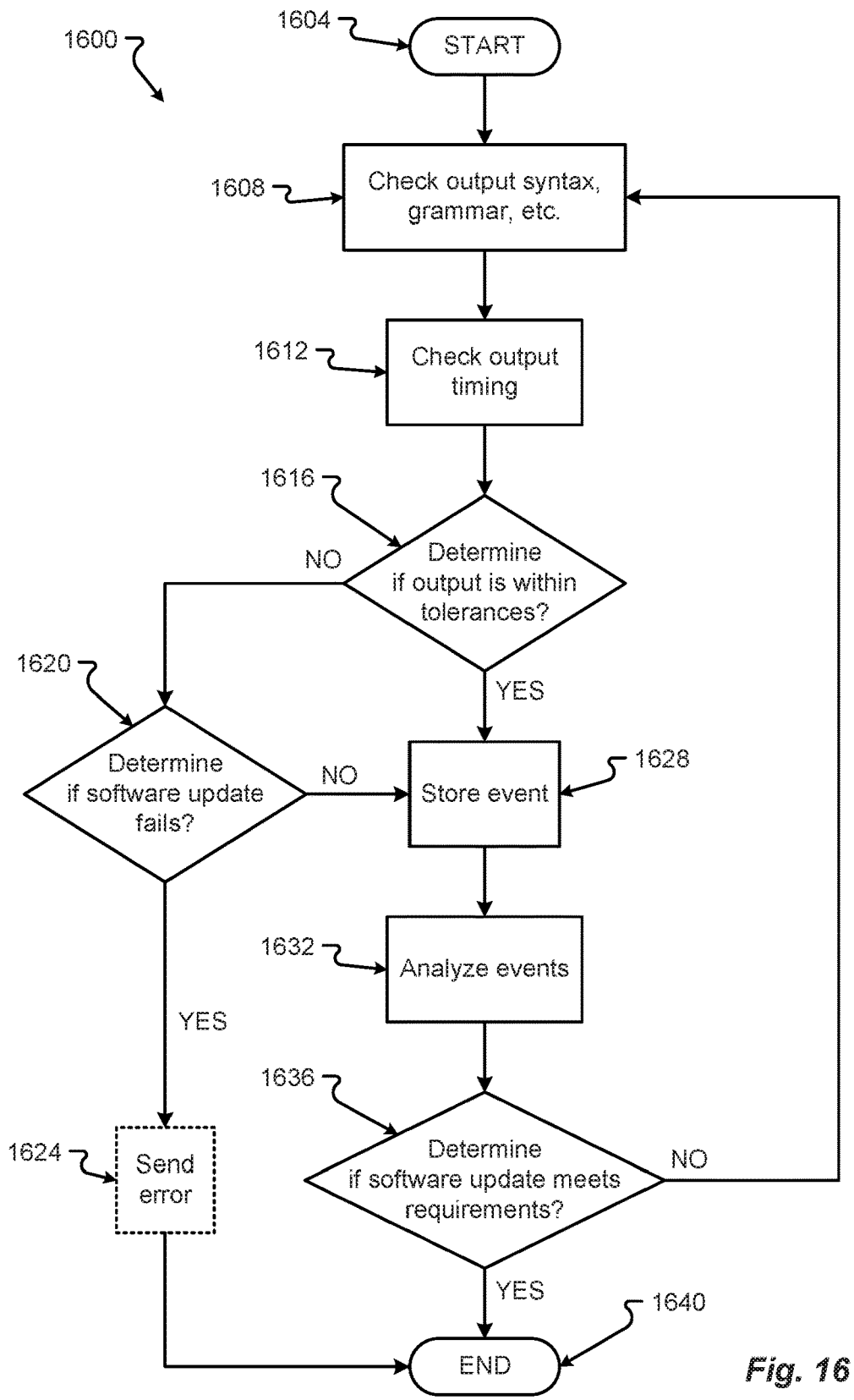
FIG. 16 is another method diagram providing another embodiment of a method for updating software in an electric vehicle.

An embodiment of a method 1600 for the evaluator 1320 to evaluate the performance of the updated OS in VM 1224 may be as shown in FIG. 16. The method 1600 may be from the perspective of the hypervisor 1212. A general order for the steps of the method 1600 is shown in FIG. 16. Generally, the method 1600 starts with a start operation 1604 and ends with an end operation 1640. The method 1600 can include more or fewer steps or can arrange the order of the steps differently than those shown in FIG. 16. The method 1600 can be executed as a set of computer-executable instructions executed by a computer system or processor and encoded or stored on a computer readable medium. Hereinafter, the method 1600 shall be explained with reference to the systems, components, circuits, modules, software, data structures, signaling processes, methods, etc. described in conjunction with FIGS. 1-15.

The comparator 1316 can check the output from VM 1224 in comparison with an output from VM 1204, in step 1608. Here, the comparator 1316 can check the actual output syntax, grammar, content, etc. to ensure that the output is equivalent to or the same as the output from VM 1204. Further, the comparator 1316 can also check the timing of the output, in step 1612. In other words, the comparator 1316 can ensure that the output from VM 1224 was received before, concurrent, or contemporaneously with the output from VM 1204. The comparator 1316 may then determine if the comparisons on timing, syntax, etc., is within tolerances provided in the failure rate information 1420, in step 1616. Thus, the timing may be considered contemporary if the output from VM 1224 is received within some time period after the output from the OS executing in VM 1204. Further, the content may also have types of evaluations and tolerances.

If the comparator 1316 determines that the comparisons are within tolerances, the comparator 1316 may send the positive evaluation information to the evaluator 1320, and the method 1600 may proceed YES to step 1628. However, if the comparisons are not within tolerances, the comparator 1316 may send the negative evaluation information to the evaluator 1320, and the method 1600 may proceed NO to step 1620. The evaluator 1320 may then determine if the updated OS in VM 1224 has failed the evaluation, in step 1620. Here, the evaluator 1320 may determine more information from the failure rate information 1420 that determines the number of errors or failures required before the OS is considered to fail the evaluation. Further, the evaluator 1320 may send the instance of the failure on to outside sources. Here, regardless of whether there is determined to be a failure, the method 1600 proceeds YES to send an error report, in step 1624, to outside sources. Further, the evaluator 1320 may spin down the deployed VM 1224. If no failure is considered to have occurred, the method 1600 proceeds NO to step 1628.

In step 1628, the evaluator 1320 may store the event in memory 1136. The stored events may accumulate during the evaluation period. Then, the evaluator 1320 can analyze the events, in step 1632, as a collection. In this way, the evaluator 1320 may determine the number of errors that have occurred during the evaluation period. This collected error information may then also be compared with failure rate information 1420 to determine if the new OS executed in VM 1224 meets requirements, in step 1636. In other words, if the error rate of the updated OS is within tolerances, then the updated OS software may still be executed or become active. However, if there are too many errors and the updated OS software does not meet requirements, the method 1600 may proceed NO back to step 1608 to continue to check the software or may also end in failing the OS software such that the VM 1224 is spun down. If the software does meet requirements, the method 1600 proceeds YES to end step or to update the software as explained in conjunction with FIG. 15.

The exemplary systems and methods of this disclosure have been described in relation to vehicle systems and electric vehicles. However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or VM processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: a memory; a hardware interface in communication with a system of the vehicle, wherein the system controls a function of the vehicle; a processor in communication with the memory, the processor capable to execute: a first virtual machine (VM) that executes a first operating system (OS); and a second VM that executes a second OS; a hypervisor in communication with the first VM, the second VM, and the hardware interface, the hypervisor: receives an input from the hardware interface; forwards the input to the first VM and the second VM; receives a first output from the first VM; forwards the first output to the hardware interface; receives a second output from the second VM; and blocks the second output from being sent to the hardware interface.

Any of the one or more above aspects, wherein the hypervisor further compares the first output to the second output.

Any of the one or more above aspects, wherein, based on the comparison, the hypervisor further determines if the first output and the second output are similar.

Any of the one or more above aspects, wherein the first VM executes the first OS as an active OS that controls functions of the vehicle.

Any of the one or more above aspects, wherein the second VM executes an updated version of the active OS.

Any of the one or more above aspects, wherein, if the hypervisor determines that the first output and the second output are similar, the hypervisor transitions the second OS to the active OS.

Any of the one or more above aspects, wherein the hypervisor further deactivates the first OS after the second OS is active.

Any of the one or more above aspects, wherein the hypervisor evaluates two or more comparisons to determine if the second OS should become the active OS.

Any of the one or more above aspects, wherein, when the first VM is executing the first OS as the active OS, the processor executes a third VM with a hot-swappable backup of the first OS.

Any of the one or more above aspects, wherein the third VM is transitioned to execute the second OS after the second OS becomes active.

Embodiments further include a method for controlling an electric vehicle, comprising: a processor executing a first virtual machine (VM), a second VM, and a hypervisor; the first VM executing a first operating system (OS); and the second VM executing a second OS; the hypervisor: receiving an input from a hardware interface that is in communication with a system of the electric vehicle, wherein the system controls a function of the vehicle; forwarding the input to the first VM and the second VM; receiving a first output from the first VM; forwarding the first output to the hardware interface; receiving a second output from the second VM; blocking the second output from being sent to the hardware interface; comparing the first output to the second output; wherein, based on the comparison, determining if the first output and the second output are similar; and wherein, if the first output and the second output are similar, transitioning the second OS executing in the second VM to function as an active OS.

Any of the one or more above aspects, wherein, before transitioning the second OS, the first VM executes the first OS as the active OS that controls functions of the vehicle.

Any of the one or more above aspects, wherein, before transitioning the second OS, the second VM executes the second OS as an updated version of the active OS.

Any of the one or more above aspects, further comprising the hypervisor deactivating the first OS after the second OS is active.

Any of the one or more above aspects, further comprising: the hypervisor evaluating two or more comparisons to determine if the second OS should become the active OS; wherein, when the first VM is executing the first OS as the active OS, the processor executing a third VM with a hot-swappable backup of the first OS; and the processor transitioning the third VM to execute the second OS after the second OS becomes active.

Embodiments include a non-transitory computer readable medium having stored thereon instructions that cause a processor of an electric vehicle to conduct a method for updating the operating system of the processor, the method comprising: executing a first virtual machine (VM), a second VM, and a hypervisor; the first VM executing a first operating system (OS); and the second VM executing a second OS; the hypervisor: executing an active VM interface, an update VM interface, a hypervisor hardware interface, a comparator, and an evaluator; the hypervisor hardware interface receiving an input from a hardware interface that is in communication with a system of the electric vehicle, wherein the system controls a function of the vehicle; the active VM interface forwarding the input to the first VM; the update VM interface forwarding the input to the second VM; the active VM interface receiving a first output from the first VM; the active VM interface forwarding the first output to the hypervisor hardware interface; the hypervisor hardware interface sending the first output to the hardware interface; the update VM interface receiving a second output from the second VM; the update VM interface blocking the second output from being sent to the hardware interface; the comparator comparing the first output to the second output; wherein, based on the comparison, the evaluator determining if the first output and the second output are similar; and wherein, if the first output and the second output are similar, the evaluator transitioning the second OS executing in the second VM to function as an active OS.

Any of the one or more above aspects, wherein, before transitioning the second OS, the first VM executes the first OS as the active OS that controls functions of the vehicle.

Any of the one or more above aspects, wherein, before transitioning the second OS, the second VM executes the second OS as an updated version of the active OS.

Any of the one or more above aspects, wherein the method further comprises the evaluator deactivating the first OS after the second OS is active.

Any of the one or more above aspects, wherein the method further comprises: the evaluator evaluating two or more comparisons to determine if the second OS should become the active OS; wherein, when the first VM is executing the first OS as the active OS, the method further comprising executing a third VM with a hot-swappable backup of the first OS; and the evaluator transitioning the third VM to execute the second OS after the second OS becomes active.

Any of the one or more above aspects, further comprising a first power control unit (PCU) electrically connected to the first motor and in communication with the first VCU and second VCU, wherein the first PCU provides power input to the first motor based on commands from the first VCU or second VCU.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle," as used herein, refers to a vehicle that may combine a conventional (usually fossil fuel-powered) powertrain with some form of electric propulsion.

Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV," as used herein, refers to a vehicle with on board rechargeable energy storage, including electric vehicles and hybrid electric vehicles.

The term "hypervisor," as used herein, can refer to a virtual machine monitor (VMM) that may be computer software, firmware, and/or hardware, that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and OS X instances can all run on a single physical x86 machine. This contrasts with operating-system-level virtualization, where all instances (usually called containers) must share a single kernel, though the guest operating systems can differ in user space.

The term "virtual machine," as used herein, may refer to an emulation of a computer system. Virtual machines are based on computer architectures and provide functionality of a physical computer. Their implementations may involve specialized hardware, software, or a combination. The virtual machines described herein may include one or more different kinds of virtual machines, each with different functions. For example, the virtual machines may be system virtual machines (e.g., a full virtualization VM) provide a substitute for a real machine. The system virtual machine provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs.

An "operating system," as used herein, may refer to system software that manages computer hardware and software resources and provides common services for computer programs. All computer programs, excluding firmware, may require an operating system to function.

What is claimed is:

1. A software updating apparatus that operates on an electric vehicle, comprising:
 a memory;
 a hardware interface in communication with a system of the electric vehicle, wherein the system controls a function of the electric vehicle;
 reserved resources for loading and testing an updated version of an active operating system (OS) of the electric vehicle;
 a processor in communication with the memory, wherein the processor:
  deploys a first virtual machine (VM) that executes a first operating system, the first OS being the active OS for the system of the electric vehicle;
  deploys a second VM in the reserved resources that executes the updated version of the first OS; and
  deploys a third VM that executes a backup copy of the first OS, the backup copy being used for hot swapping the active OS executed by the first OS in case of a failure of the first OS or the first VM; and
 a hypervisor in communication with the first VM, the second VM, the third VM, and the hardware interface, wherein the hypervisor:
  receives an input from the hardware interface and forwards the input to the first VM executing the first OS and the second VM executing the updated version of the first OS;
  receives a first output from the first VM and forwards the first output to the hardware interface for controlling the function of the electric vehicle;
  receives a second output from the second VM and blocks the second output from being sent to the hardware interface such that the second output is not used for controlling the function of the electric vehicle;
  compares the first output and the second output;
  in response to the comparison, deploys, based on one or more rules, the updated version of the first OS executed by the second VM as the active OS and deconstructs a connection between the first VM and the hypervisor;
  updates the third VM to the updated version of the first OS and assign the third VM as a backup version of the active OS executed by the second VM, the updated version of the first OS in the third VM being used for hot swapping the active OS executed by the second VM in case of a failure of the second VM or a failure of the active OS in the second VM; and
  reserves resources of the first VM for a future update of the active OS being executed by the second VM.

2. The vehicle of claim 1, wherein the hypervisor evaluates two or more comparisons to determine if the updated version of the first OS in the second VM should become the active OS.

3. The vehicle of claim 1, wherein the one or more rules include one or more of an update identifier, a time for evaluation indicating a time required to validate operation of the updated version of the first OS, a number of evaluations indicating a number of comparisons of outputs required to validate operation of the updated version of the first OS, and a failure rate indicating a maximum number of errors to validate operation of the updated version of the first OS.

4. The vehicle of claim 3, wherein the one or more rules includes the update identifier, the update identifier being a globally unique identifier of the updated version of the first OS executing in the second VM or an identifier of one or more components within the updated version of the first OS.

5. A method for updating software controlling a function of an electric vehicle, comprising:
 executing a first virtual machine (VM), a second VM, and a hypervisor,
 reserving resources for loading and testing an updated version of an active operating system (OS) of the electric vehicle, the first VM executing a first operating system (OS) that is the active OS for controlling the function of the electric vehicle;
 deploying the second VM in the reserved resources and executing the updated version of the first OS in the second VM;
 deploying, by a third VM, a backup copy of the first OS, the backup copy being used for hot swapping the active OS in case of a failure of the first OS or the first VM;
 receiving an input from a hardware interface that is in communication with a system of the electric vehicle, wherein the system controls the function of the vehicle;
 forwarding the input to the first VM and the second VM;
 receiving a first output from the first VM and forwarding the first output to the hardware interface for controlling the function of the electric vehicle;
 receiving a second output from the second VM and blocking the second output from being sent to the hardware interface so that the second output does not control the function of the vehicle;
 comparing the first output to the second output for a predetermined amount of time;
 deploying, based on the comparison and one or more rules, the updated version of the first OS executed by the second VM as the active OS and deconstructing a connection between the first VM and the hypervisor;
 updating the third VM to the updated version of the first OS and assigning the third VM as a backup version of the active OS executed by the second VM that is used for hot swapping the active OS executed by the second VM in case of a failure of the second VM or a failure of the active OS executed by the second VM; and reserving resources of the first VM for a future update of the active OS being executed by the second VM.

6. The method of claim 5, wherein the one or more rules include one or more of an update identifier, the update identifier being a globally unique identifier of the updated version of the first OS executing in the second VM or an identifier of one or more components within the updated version of the first OS, a time for evaluation indicating a time required to validate operation of the updated version of the first OS, a number of evaluations indicating a number of comparisons of outputs required to validate operation of the updated version of the first OS, and a failure rate indicating a maximum number of errors to validate operation of the updated version of the first OS.

7. The method of claim 5, further comprising:

evaluating two or more comparisons to determine if the updated version of the first OS should become the active OS.

8. A non-transitory computer readable medium having stored thereon instructions that cause a processor of an electric vehicle to conduct a method for updating the operating system of the processor, the method comprising:

executing a first virtual machine (VM), the first VM executing a first operating system (OS) that is an active OS for controlling a function of the electric vehicle;

reserving resources for loading and testing an updated version of the active OS of the electric vehicle;

deploying a second VM in the reserved resources and executing the updated version of the first OS in the second VM;

deploying a third VM in the reserved resources;

executing, by the third VM, a backup copy of the first OS, the backup copy being used for hot swapping the active OS in case of a failure of the first OS or the first VM;

receiving, by a hypervisor, an input from a hardware interface that is in communication with a system of the electric vehicle, wherein the system controls the function of the vehicle;

forwarding the input to the first VM and the second VM;

receiving a first output from the first VM and forwarding the first output to the hardware interface for controlling the function of the electric vehicle;

receiving a second output from the second VM and blocking the second output from being sent to the hardware interface so that the second output does not control the function of the vehicle;

comparing the first output to the second output for a predetermined amount of time;

deploying, based on the comparison and one or more rules, the updated version of the first OS in the second VM as the active OS and deconstructing a connection between the first VM and the hypervisor;

updating the third VM to the updated version of the first OS and assigning the third VM as a backup version of the active OS executed by the second VM, the backup version of the active OS being used for hot swapping the active OS executed by the second VM in case of a failure of the second VM or a failure of the active OS executed by the second VM; and reserving resources of the first VM for a future update of the active OS being executed by the second VM.

9. The non-transitory computer readable medium of claim 8, wherein the one or more rules include one or more of an update identifier, the update identifier being a globally unique identifier of the updated version of the first OS executing in the second VM or an identifier of one or more components within the second OS, a time for evaluation indicating a time required to validate operation of the updated version of the first OS, a number of evaluations indicating a number of comparisons of outputs required to validate operation of the updated version of the first OS, and a failure rate indicating a maximum number of errors provided to validate operation of the updated version of the first OS.

10. The non-transitory computer readable medium of claim 8, wherein the method further comprises:

evaluating two or more comparisons to determine if the second OS should become the active OS.

* * * * *

UNITED STATES PATENT AND TRADEMARK OFFICE
CERTIFICATE OF CORRECTION

PATENT NO. : 10,360,020 B2
APPLICATION NO. : 15/484469
DATED : July 23, 2019
INVENTOR(S) : Yanir Hirshberg It is certified that error appears in the above-identified patent and that said Letters Patent is hereby corrected as shown below:

In the Claims

Claim 1, Column 34, Line 7, replace "assign" with --assigns-- therein.
Claim 7, Column 35, Line 20, after "if" delete "the" therein.

Signed and Sealed this
Twenty-eighth Day of January, 2020

Andrei Iancu
*Director of the United States Patent and Trademark Office*